United States Patent
Dong et al.

(10) Patent No.: US 10,747,046 B2
(45) Date of Patent: Aug. 18, 2020

(54) DISPLAY SUBSTRATE, DISPLAY PANEL AND DISPLAY APPARATUS HAVING THE SAME, AND FABRICATING METHOD THEREOF

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Anxin Dong, Beijing (CN); Huifang Yuan, Beijing (CN); Bin Li, Beijing (CN); Sangman Yuk, Beijing (CN); Tao Zhu, Beijing (CN); Haibin Yin, Beijing (CN); Jian Chen, Beijing (CN); Qun Fang, Beijing (CN); Wenhao Tang, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei (CN)

( * ) Notice: Subject to any disclaimer, the term of this patent is extended or adjusted under 35 U.S.C. 154(b) by 0 days.

(21) Appl. No.: 16/264,899

(22) Filed: Feb. 1, 2019

(65) Prior Publication Data

US 2019/0162884 A1    May 30, 2019

Related U.S. Application Data

(63) Continuation-in-part of application No. 15/325,866, filed as application No. PCT/CN2016/082879 on May 20, 2016, now Pat. No. 10,268,067.

(30) Foreign Application Priority Data

Jul. 1, 2015    (CN) .......................... 2015 1 0391596

(51) Int. Cl.
   *G02F 1/1335*    (2006.01)
   *G02B 5/20*    (2006.01)
   (Continued)

(52) U.S. Cl.
   CPC ....... *G02F 1/133512* (2013.01); *G02B 5/201* (2013.01); *G02F 1/1339* (2013.01);
   (Continued)

(58) Field of Classification Search
   CPC .......... G02F 1/13394; G02F 1/133512; G02F 1/133514; G02F 1/136209; G02F 1/13473;
   (Continued)

(56) References Cited

U.S. PATENT DOCUMENTS

2001/0026347 A1 * 10/2001 Sawasaki .......... G02F 1/133707
                                                      349/156
2002/0060771 A1    5/2002 Sumino et al.
(Continued)

FOREIGN PATENT DOCUMENTS

CN    1379060 A    11/2002
CN    1979229 A    6/2007
(Continued)

OTHER PUBLICATIONS

The extended European search report in the European Patent Application No. 16817070.2, dated Jan. 7, 2019.
(Continued)

*Primary Examiner* — Shan Liu
(74) *Attorney, Agent, or Firm* — Intellectual Property Valley Law, P.C.

(57) ABSTRACT

A display substrate includes a base substrate; a black matrix on the base substrate and in the black matrix region, the black matrix comprising a plurality of rows and a plurality of columns intersecting each other; a first color filter layer
(Continued)

having a net structure with a plurality of openings, and comprising a first portion in the first region and a second portion in the black matrix region, the first color filter layer substantially covering the plurality of columns of the black matrix; a second color filter layer in the second region; and a third color filter layer in the third region. A first height of a surface of the first portion away from the base substrate relative to the base substrate and a second height of a surface of the second portion away from the base substrate relative to the base substrate are within 30% of each other.

18 Claims, 17 Drawing Sheets

(51) Int. Cl.
    *G02F 1/1339*     (2006.01)
    *G02F 1/1362*     (2006.01)

(52) U.S. Cl.
    CPC .... *G02F 1/136209* (2013.01); *G02F 1/13394* (2013.01); *G02F 1/133514* (2013.01); *G02F 2001/136222* (2013.01)

(58) Field of Classification Search
    CPC ... G02F 1/133371; G02F 2001/136222; G02F 2001/136218; H01J 11/44; H01J 2211/444; H01J 2329/323; H01J 29/327
    USPC .................................................. 349/106–111
    See application file for complete search history.

(56) References Cited

U.S. PATENT DOCUMENTS

| | | | |
|---|---|---|---|
| 2004/0189895 A1* | 9/2004 | Chen | G02F 1/133514 349/106 |
| 2005/0105017 A1* | 5/2005 | Choi | G02F 1/133516 349/109 |
| 2005/0117092 A1* | 6/2005 | Park | G02F 1/133514 349/106 |
| 2005/0134763 A1 | 6/2005 | Kang | |
| 2007/0132921 A1 | 6/2007 | Yoon | |
| 2007/0216832 A1 | 9/2007 | Takahashi et al. | |
| 2009/0135345 A1 | 5/2009 | Yajima et al. | |
| 2009/0153785 A1* | 6/2009 | Iwato | G02F 1/13394 349/106 |
| 2009/0161046 A1 | 6/2009 | Tokuda et al. | |
| 2009/0161047 A1 | 6/2009 | Cho et al. | |
| 2011/0069258 A1* | 3/2011 | Joo | G02B 5/201 349/106 |
| 2011/0155296 A1* | 6/2011 | Nakamura | G02B 5/201 156/67 |
| 2013/0128193 A1 | 5/2013 | Yang et al. | |
| 2013/0222746 A1* | 8/2013 | Itoh | G02B 5/201 349/106 |
| 2014/0168584 A1* | 6/2014 | Lee | G02F 1/133514 349/106 |
| 2015/0062506 A1 | 3/2015 | Cho et al. | |
| 2015/0138477 A1* | 5/2015 | You | G02F 1/1335 349/43 |
| 2016/0062170 A1 | 3/2016 | Yin | |

FOREIGN PATENT DOCUMENTS

| | | |
|---|---|---|
| CN | 101042445 A | 9/2007 |
| CN | 101326044 A | 12/2008 |
| CN | 101326462 A | 12/2008 |
| CN | 104298010 A | 1/2015 |
| CN | 104460105 A | 3/2015 |
| CN | 104460142 A | 3/2015 |
| JP | 2002311227 A | 10/2002 |
| JP | 2003139938 A | 5/2003 |
| JP | 2008083364 A | 4/2008 |
| JP | 2008268511 A | 11/2008 |
| JP | 2012027385 A | 2/2012 |
| JP | 2012211952 A | 11/2012 |
| JP | 2014038354 A | 2/2014 |
| KR | M060130302 U | 12/2006 |
| KR | 20070021750 A | 2/2007 |
| KR | M070036867 U | 4/2007 |
| KR | 20110053016 A | 5/2011 |
| KR | 20110054723 A | 5/2011 |
| KR | 101055190 B1 | 8/2011 |
| KR | 20130135547 A | 12/2013 |

OTHER PUBLICATIONS

Third Office Action in the Chinese Patent Application No. 201510391596.7, dated Dec. 12, 2019; English translation attached.
International Search Report & Written Opinion dated Aug. 31, 2016 regarding PCT/CN2016/082879.
First Office Action in the Chinese Patent Application No. 201510391596.7, dated Aug. 1, 2017; English translation attached.
Second Office Action in the Chinese Patent Application No. 201510391596.7, dated Jul. 30, 2018; English translation attached.
Notice of Allowance in the U.S. Appl. No. 15/325,866, dated Nov. 14, 2018.
Non-Final Office Action in the U.S. Appl. No. 15/325,866, dated May 29, 2018.
Response to Non-Final Office Action in the U.S. Appl. No. 15/325,866, dated Aug. 29, 2018.
Applicant-Initiated Interview Summary in the U.S. Appl. No. 15/325,866, dated Sep. 5, 2018.
Response to Applicant-Initiated Interview Summary in the U.S. Appl. No. 15/325,866, dated Sep. 13, 2018.
Restriction Requirement in the U.S. Appl. No. 15/325,866, dated Mar. 12, 2018.
Response to Restriction Requirement in the U.S. Appl. No. 15/325,866, dated Apr. 16, 2018.

\* cited by examiner

DISPLAY SUBSTRATE, DISPLAY PANEL AND DISPLAY APPARATUS HAVING THE SAME, AND FABRICATING METHOD THEREOF

CROSS-REFERENCE TO RELATED APPLICATION

This application is a continuation-in-part of U.S. application Ser. No. 15/325,866 filed May 20, 2016, which is a national stage application under 35 U.S.C. § 371 of International Application No. PCT/CN2016/082879, filed May 20, 2016, which claims priority to Chinese Patent Application No. 201510391596.7, filed Jul. 1, 2015. Each of the forgoing applications is herein incorporated by reference in its entirety for all purposes.

TECHNICAL FIELD

The present invention relates to display technology, more particularly, to a display substrate, a display panel and a display apparatus having the same, and a fabricating method thereof.

BACKGROUND

FIG. 1 shows the structure of a conventional display substrate having a base substrate 11, a black matrix 12, color filters, and a protective layer 14. Typically, the color filters correspond to pixel regions, the black matrix 12 corresponds to a boundary region between adjacent pixel regions. As shown in FIG. 1, the color filters are spaced apart by the black matrix 12. FIG. 1 illustrates the structure of a display substrate having a red color filter and a blue color filter, which form a gap above the black matrix 12. The protective layer 14 is formed over the color filters and the black matrix 12. The gap between two adjacent color filter results in a recess having a depth ΔH in the protective layer 14 at a region above the black matrix 12. Typically, the depth ΔH is in the range of about 0.5 µm to about 1.0 µm. In a conventional display substrate, a spacer is disposed within the recess.

SUMMARY

In one aspect, the present invention provides a display substrate comprising a base substrate having at least a first region, a second region adjacent to the first region, a third region adjacent to the second region and spaced apart from the first region by the second region on one side, and a black matrix region; a black matrix in the black matrix region on the base substrate comprising a plurality of rows and a plurality of columns intersecting each other; a first color filter layer in a first region and extending into the black matrix region, the first color filter layer overlapping with the black matrix throughout the plurality of columns of the black matrix; a second color filter layer in the second region; and a third color filter layer in the third region.

Optionally, the first color filter layer overlaps with the black matrix throughout the plurality of rows and the plurality of columns of the black matrix.

Optionally, the first color filter layer completely covers an entire area of the black matrix region throughout the plurality of rows and the plurality of columns of the black matrix.

Optionally, the first color filter layer abuts the second color filter layer at an interface between the first color filter layer and the second color filter layer, the interface is within the black matrix region.

Optionally, the first color filter layer abuts the second color filter layer at an interface between the first color filter layer and the second color filter layer, the interface is outside the black matrix region.

Optionally, the first color filter layer extends into an interface between the second color filter layer and the third color filter layer, the first color filter layer abuts the second color filter layer on a first side and abuts the third color filter layer on a second side at the interface.

Optionally, the display substrate further comprises a protective layer at an interface between the second color filter layer and the third color filter layer, the protective layer abuts the second color filter layer on a first side and abuts the third color filter layer on a second side at the interface.

Optionally, the second color filter layer and the third color filter layer abut each other at an interface between the second color filter layer and the third color filter layer.

Optionally, the display substrate further comprises a fourth color filter layer in a fourth region on the base substrate, the fourth region adjacent to the third region, the third region spaced apart from the first region by the second region on a first side and spaced apart from the first region by the fourth region on a second side.

Optionally, the first color filter layer is a blue color filter layer.

Optionally, the display substrate further comprises a spacer layer having a plurality of spacers in the black matrix region, the plurality of spacers are substantially on a same level with each other.

In another aspect, the present invention provides a method of fabricating a display substrate comprising forming a black matrix comprising a plurality of rows and a plurality of columns intersecting each other in a black matrix region on a base substrate; the base substrate having at least a first region, a second region adjacent to the first region, a third region adjacent to the second region and spaced apart from the first region by the second region on one side, and the black matrix region; forming a first color filter layer in the first region and extending into the black matrix region, the first color filter layer overlapping with the black matrix at least throughout the plurality of columns of the black matrix; forming a second color filter layer in the second region; and forming a third color filter layer in the third region.

Optionally, the first color filter layer is formed to overlap with the black matrix throughout the plurality of rows and the plurality of columns of the black matrix.

Optionally, the first color filter layer is formed to completely cover an entire area of the black matrix region throughout the plurality of rows and the plurality of columns of the black matrix.

Optionally, the first color filter layer is formed to abut the second color filter layer at an interface between the first color filter layer and the second color filter layer, the interface is within the black matrix region.

Optionally, the first color filter layer is formed to abut the second color filter layer at an interface between the first color filter layer and the second color filter layer, the interface is outside the black matrix region.

Optionally, the first color filter layer is formed to extend into an interface between the second color filter layer and the third color filter layer, the first color filter layer abuts the second color filter layer on a first side and abuts the third color filter layer on a second side at the interface.

Optionally, the method further comprises forming a protective layer at an interface between the second color filter layer and the third color filter layer, the protective layer is formed to abut the second color filter layer on a first side and abut the third color filter layer on a second side at the interface.

Optionally, the second color filter layer and the third color filter layer are formed to abut each other at an interface between the second color filter layer and the third color filter layer.

Optionally, the method further comprises forming a fourth color filter layer in a fourth region on the base substrate, the fourth region adjacent to the third region, the third region spaced apart from the first region by the second region on a first side and spaced apart from the first region by the fourth region on a second side.

Optionally, the first color filter layer is a blue color filter layer.

Optionally, the method further comprises forming a spacer layer having a plurality of spacers in the black matrix region.

In another aspect, the present invention provides a display panel comprising the display substrate described herein or fabricated by a method described herein, a package substrate, and a spacer layer between the display substrate and the package substrate, wherein the spacer layer comprising a plurality of spacers in the black matrix region.

In another aspect, the present invention provides display apparatus comprising the display panel described herein.

In another aspect, the present invention provides a display substrate having at least a first region corresponding to a subpixel of a first color, a second region adjacent to the first region and corresponding to a subpixel of a second color, a third region adjacent to the second region and spaced apart from the first region by the second region on one side, the third region corresponding to a subpixel of a third color, and a black matrix region outside the first region, the second region, and the third region, comprising a base substrate; a black matrix on the base substrate and in the black matrix region, the black matrix comprising a plurality of rows and a plurality of columns intersecting each other; a first color filter layer having a net structure with a plurality of openings, and comprising a first portion in the first region and a second portion in the black matrix region, the first color filter layer substantially covering the plurality of columns of the black matrix; a second color filter layer in the second region; and a third color filter layer in the third region; wherein the second color filter layer and the third color filter layer are both in the plurality of openings, and are respectively spaced apart from the first color filter layer; a first height of a surface of the first portion away from the base substrate relative to the base substrate and a second height of a surface of the second portion away from the base substrate relative to the base substrate are within 30% of each other.

Optionally, a difference between the height h2 and the height h1 is greater than or equal to 0, and less than or equal to a thickness of the black matrix between the second portion and the base substrate, and the second height is greater than or equal to the first height.

Optionally, the first color filter layer covers 80% to 90% of a respective one of the plurality of columns of the black matrix along a row direction.

Optionally, a color filter layer other than the first color filter layer and directly adjacent to the respective one of the plurality of columns of the black matrix covers 1% to 10% of the respective one of the plurality of columns of the black matrix along the row direction.

Optionally, 0% to 5% of respective one of the plurality of columns of the black matrix along the row direction is uncovered by any color filter layer.

Optionally, at least one of two color filter layers directly adjacent to a respective one of the plurality of rows of the black matrix at least partially covers the respective one of the plurality of rows of the black matrix.

Optionally, the two color filter layers directly adjacent to the respective one of the plurality of rows of the black matrix are spaced apart from each other by a gap in the black matrix region and on a side of the respective one of the plurality of rows of the black matrix away from the base substrate.

Optionally, each of the two color filter layers directly adjacent to the respective one of the plurality of rows of the black matrix partially covers the respective one of the plurality of rows of the black matrix, the two color filter layers corresponding to subpixels other than a subpixel of white color.

Optionally, the display substrate further has a fourth region adjacent to the third region and corresponding to a subpixel of a fourth color, the third region spaced apart from the first region by the second region on a first side and spaced apart from the first region by the fourth region on a second side.

Optionally, the subpixel of the fourth color is a white subpixel; and the third color filter layer at least partially covers a respective one of the plurality of rows of the black matrix between, and directly adjacent to, the third region and the fourth region.

Optionally, the display substrate further comprises a fourth color filter layer in the fourth region, the fourth color filter layer comprising a substantially transparent material.

Optionally, the display substrate further comprises a protective layer on a side of the first color filter layer, the second color filter layer, the third color filter layer, and the black matrix away from the base substrate; wherein a portion of the protective layer extends into the fourth region, constituting the fourth color filter layer.

Optionally, the subpixel of the fourth color is a yellow subpixel; the display substrate further comprises a fourth color filter layer in the fourth region, the fourth color filter being a yellow color filter; and each of the third color filter layer and the fourth color filter layer at least partially covers a respective one of the plurality of rows of the black matrix between, and directly adjacent to, the third region and the fourth region.

Optionally, the display substrate further comprises a spacer layer having a plurality of spacers in the black matrix region, the plurality of spacers being in regions corresponding to the plurality of columns of the black matrix.

Optionally, a respective one of the plurality of columns of the black matrix has a first width along a row direction; a respective one of the plurality of rows of the black matrix has a second width along a column direction; and a ratio of first width to the second width is in a range of 3:1 to 10:1.

Optionally, a respective subpixel aperture of the display substrate has an elongated shape; a respective one of the plurality of columns of the black matrix has a first width along a row direction; and a ratio of a longitudinal width of the elongated shape to the first width is in a range of 2.0 to 3.5.

Optionally, the display substrate further has a fourth region adjacent to the third region and corresponding to a subpixel of a white color, the third region spaced apart from the first region by the second region on a first side and spaced apart from the first region by the fourth region on a second side; the display substrate further comprises a protective layer on a side of the first color filter layer, the second color filter layer, the third color filter layer, and the black matrix away from the base substrate; a portion of the protective layer extends into the fourth region, constituting a substantially transparent fourth color filter layer for the subpixel of the white color; two color filter layers other than the substantially transparent fourth color filter layer and directly adjacent to the respective one of the plurality of rows of the black matrix partially cover the respective one of the plurality of rows of the black matrix and are spaced apart from each other by a gap in the black matrix region and on a side of the respective one of the plurality of rows of the black matrix away from the base substrate; the substantially transparent fourth color filter layer is in direct contact with a directly adjacent color filter layer in the black matrix region and on a side of the respective one of the plurality of rows of the black matrix away from the base substrate, the substantially transparent fourth color filter layer and the directly adjacent color filter layer covering the respective one of the plurality of rows of the black matrix; two color filter layers other than the substantially transparent fourth color filter layer and directly adjacent to the respective one of the plurality of columns of the black matrix partially cover the respective one of the plurality of columns of the black matrix and are spaced apart from each other by a gap in the black matrix region B and on a side of the respective one of the plurality of columns of the black matrix away from the base substrate; the substantially transparent fourth color filter layer is in direct contact with the first color filter layer in the black matrix region and on a side of the respective one of the plurality of columns of the black matrix away from the base substrate, the substantially transparent fourth color filter layer and the first color filter layer covering the respective one of the plurality of columns of the black matrix; and the display substrate further comprises a spacer layer having a plurality of spacers in the black matrix region, the plurality of spacers being in in regions corresponding to the plurality of columns of the black matrix.

Optionally, the first color filter layer is absent in a region between the second color filter layer and the third color filter layer in the plurality of openings.

Optionally, each of the first region, the second region, and the third region has a substantially rectangular shape; wherein a longitudinal side of the substantially rectangular shape is substantially parallel to the plurality of columns of the black matrix; and a lateral side of the substantially rectangular shape is substantially parallel to the plurality of rows of the black matrix.

In another aspect, the present invention provides a display panel comprising the display substrate described herein or fabricated by a method described herein, a second display substrate facing the display substrate, and a spacer layer between the display substrate and the second display substrate, wherein the spacer layer comprising a plurality of spacers in the black matrix region, the plurality of spacers being in in regions corresponding to the plurality of columns of the black matrix.

BRIEF DESCRIPTION OF THE FIGURES

The following drawings are merely examples for illustrative purposes according to various disclosed embodiments and are not intended to limit the scope of the present invention.

DETAILED DESCRIPTION

Figure 1:
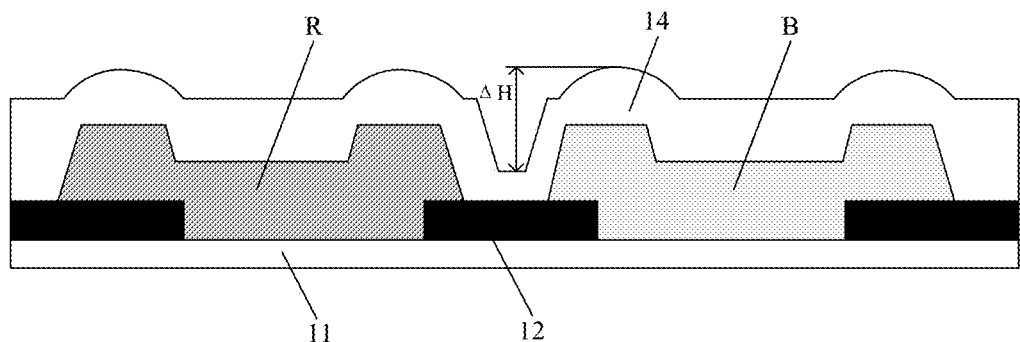
FIG. 1 is a diagram illustrating the structure of a conventional display substrate.

The disclosure will now describe more specifically with reference to the following embodiments. It is to be noted that the following descriptions of some embodiments are presented herein for purpose of illustration and description only. It is not intended to be exhaustive or to be limited to the precise form disclosed.

The gap between adjacent color filters in a conventional display substrate results in a poor surface planarization on the surface of the display substrate (e.g., the surface of the protective layer). When the spacer is disposed on the display substrate, the poor surface planarization leads to a non-uniform distribution of spacer elevations on the display substrate. Many other disadvantages are associated with the same issue. For example, when the display panel is pressed and released, the liquid crystal layer recovers from the deformation quickly back to the previous state. However, due to the existence of a recess having a depth AH on the surface of the display substrate, the liquid crystal layer around the recess region is not able to recover as quickly, resulting in darkness non-uniformity upon touch (a.k.a., "touch dark non-uniformity"). Similarly, due to the existence of these recesses on the surface of the display panel, a larger liquid crystal volume is needed to fill in the recesses, resulting in higher manufacturing costs.

The present disclosure provides a superior display substrate that overcomes the disadvantages and shortcomings of the conventional display substrate. In some embodiments, the display substrate includes a base substrate, a black matrix on the base substrate, a first color filter layer on the base substrate; the first color filter layer having an overlapping portion on a side of an overlapped portion of the black matrix distal to the base substrate. The display substrate has a surface on a side of the first color filter distal to the base substrate. Optionally, the display substrate further includes a spacer layer having a plurality of spacers on a side of the surface distal to the black matrix. Each spacer has a first side in contact with the surface, and a second side distal to the first side. The first sides of the plurality of spacers are substantially on a same level with each other and the surface. The second sides of the plurality of spacers are substantially on a same level with each other. For example, the distances between the second sides of the plurality of spacers and the base substrate are all substantially the same. Optionally, the second sides of the plurality of spacers are substantially on a same level with each other when the plurality of spacers are in an uncompressed state (e.g., prior to assembled into a cell of a display panel).

In some embodiments, the display substrate includes a base substrate, a black matrix on the base substrate, a first color filter layer on the base substrate; the first color filter layer having an overlapping portion on a side of an overlapped portion of the black matrix distal to the base substrate, a second color filter layer adjacent to and in a same layer as the first color filter layer; a surface on a side of the first color filter and the second color filter distal to the base substrate having a recess in a region corresponding to the interface between the first color filter and the second color filter; and a spacer layer having a plurality of spacers on a side of the surface distal to the black matrix; each spacer has a side in contact with and substantially level with the surface. Optionally, the overlapping portion substantially covers an entire surface of the black matrix. Optionally, the second color filter layer has an adjacent overlapping portion on a side of an adjacent overlapped portion of the black matrix distal to the base substrate. Optionally, the overlapping portion extends over the black matrix by a first distance d1 and the adjacent overlapping portion extends over the black matrix by a second distance d2; d1≠d2. Optionally, d1=d2. Optionally, the overlapping portion has a thickness substantially the same as that of the adjacent overlapping portion.

Optionally, the recess has a width a and each spacer has a width b on the surface, a≤b. The spacer may be disposed at any position of the surface of the display substrate. Optionally, at least one spacer is on a side of the overlapping portion distal to the overlapped portion. Optionally, all spacers are on a side of the overlapping portion distal to the overlapped portion. Optionally, at least one spacer is on a side of the overlapping portion distal to the overlapped portion, and at least another is on a side of the adjacent overlapping portion distal to the adjacent overlapped portion. Optionally, at least one spacer is disposed over the recess, and is substantially outside the recess (due to a≤b). Optionally, all spacers are disposed over a plurality of recesses, and are substantially outside the recess. Optionally, at least one spacer is disposed over the recess, and is substantially outside the recess, at least one spacer is on a side of the overlapping portion distal to the overlapped portion, and at least another is on a side of the adjacent overlapping portion distal to the adjacent overlapped portion.

In some embodiments, the display substrate further includes a protective layer between the first/second color filter layer and the spacer, the surface is a surface of the protective layer. The recess is on the surface of the protective layer in a region corresponding to the interface between the first color filter and the second color filter. Optionally, the first color filter and the second color filter form a gap at the interface. Due to the existence of the gap, a recess is formed on the surface of the protective layer at a region corresponding to the gap at the interface when the protective layer is formed over the color filters.

Accordingly, the present disclosure also provides a method of fabricating a display substrate. In some embodiments, the method includes forming a black matrix on a base substrate; forming a first color filter layer on the base substrate; the first color filter layer having an overlapping portion on a side of an overlapped portion of the black matrix distal to the base substrate. The display substrate has a surface on a side of the first color filter distal to the base substrate. Optionally, the method further includes forming a spacer layer having a plurality of spacers on a side of the surface distal to the black matrix; each spacer has a side in contact with and substantially level with the surface.

In some embodiments, the method includes forming a black matrix on a base substrate; forming a first color filter layer on the base substrate; the first color filter layer having an overlapping portion on a side of an overlapped portion of the black matrix distal to the base substrate; and forming a second color filter layer adjacent to and in a same layer as the first color filter layer. The display substrate having a surface on a side of the first color filter and the second color filter distal to the base substrate with a recess in a region corresponding to the interface between the first color filter and the second color filter. The method further includes forming a spacer layer comprising a plurality of spacers on a side of the surface distal to the black matrix; each spacer has a side in contact with and substantially level with the surface.

Optionally, the overlapping portion is formed substantially over an entire surface of the black matrix. Optionally, the second color filter layer has an adjacent overlapping portion on a side of an adjacent overlapped portion of the black matrix distal to the base substrate. Optionally, the overlapping portion extends over the black matrix by a first distance d1 and the adjacent overlapping portion extends over the black matrix by a second distance d2; d1≠d2. Optionally, d1=d2. Optionally, the overlapping portion has a thickness substantially the same as that of the adjacent overlapping portion.

Optionally, the recess has a width a and each spacer has a width b on the surface, a≤b. The spacer may be formed at any position of the surface of the display substrate. Optionally, at least one spacer is formed on a side of the overlapping portion distal to the overlapped portion. Optionally, all spacers are formed on a side of the overlapping portion distal to the overlapped portion. Optionally, at least one spacer is formed on a side of the overlapping portion distal to the overlapped portion, and at least another is formed on a side of the adjacent overlapping portion distal to the adjacent overlapped portion. Optionally, at least one spacer is formed over the recess, and is formed substantially outside the recess (due to a≤b). Optionally, all spacers are formed over a plurality of recesses, and are formed substantially outside the recess. Optionally, at least one spacer is formed over the recess, and is formed substantially outside the recess, at least one spacer is formed on a side of the overlapping portion distal to the overlapped portion, and at least another is formed on a side of the adjacent overlapping portion distal to the adjacent overlapped portion.

In some embodiments, the method further includes forming a protective layer on a side of the first color filter layer and the second color filter layer distal to the base substrate, the surface is a surface of the protective layer. In that case, the surface is a surface of the protective layer. The recess is on the surface of the protective layer in a region corresponding to the interface between the first color filter and the second color filter. Optionally, the first color filter and the second color filter form a gap at the interface. Due to the existence of the gap, a recess is formed on the surface of the protective layer at a region corresponding to the gap at the interface when the protective layer is formed over the color filters.

Figure 2:
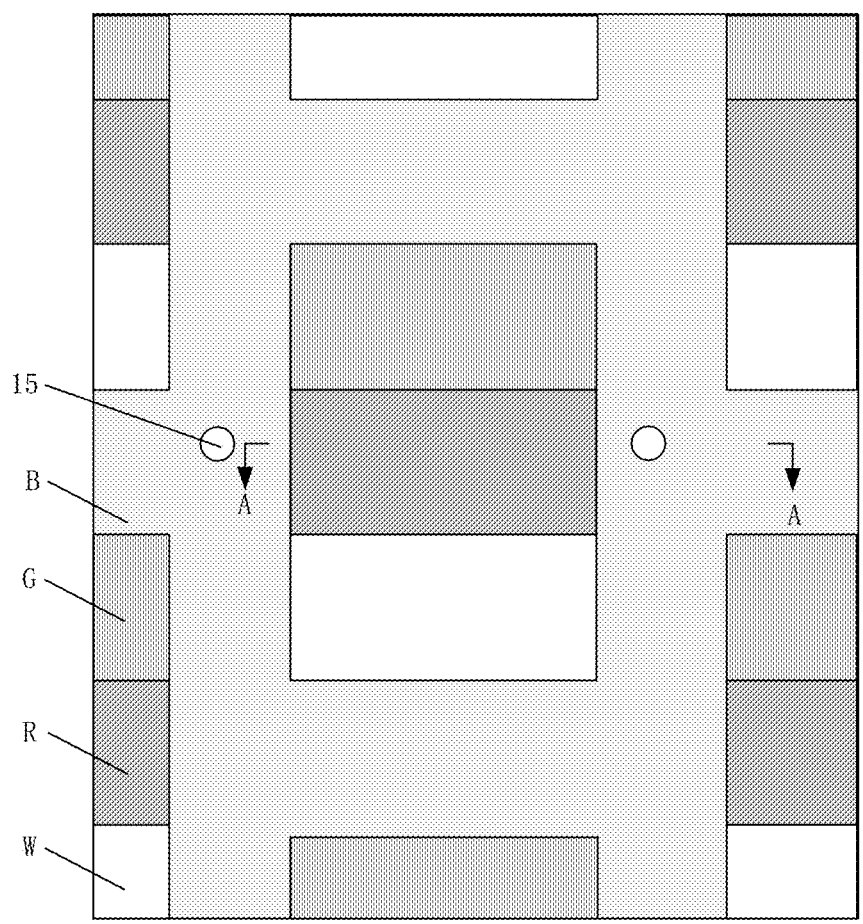
FIG. 2 is a diagram illustrating the structure of a display substrate in some embodiments.
Figure 3:
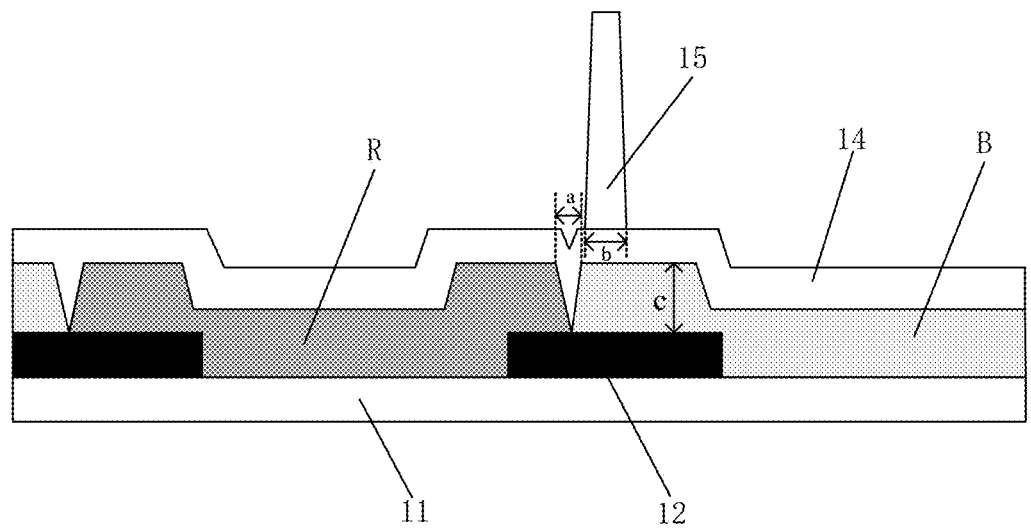
FIG. 3 is a cross-sectional view along the A-A direction of the display substrate in FIG. 2.

FIG. 2 is a diagram illustrating the structure of a display substrate in some embodiments. FIG. 3 is a cross-sectional view along the A-A direction of the display substrate in FIG. 2. Referring to FIGS. 2 and 3, the display substrate in the embodiment includes a base substrate 11, a black matrix 12 on the base substrate 11, a spacer 15 and a plurality of color filters (R, G, B, and W color filters). The color filter has an overlapping portion on a side of an overlapped portion of the black matrix 12 distal to the base substrate 11. The spacer 15 is on a side of the overlapping portion distal to the base substrate 11.

Color filters may include a red color filter R, a green color filter G, a blue color filter B, and/or a white color filter W. Optionally, the display substrate includes a red color filter R, a green color filter G, and a blue color filter B. Optionally, the display substrate includes a red color filter R, a green color filter G, a blue color filter B, and a white color filter W.

A red color filter R and a blue color filter B are shown in FIG. 3. The blue color filter in FIG. 3 has an overlapping portion on a side of an overlapped portion of the black matrix 12 distal to the base substrate 11. The red color filter in FIG. 3 has an adjacent overlapping portion on a side of an adjacent overlapped portion of the black matrix 12 distal to the base substrate 11. The spacer 15 is on a side of the overlapping portion of the blue color filter distal to the overlapped portion of the black matrix 12. The red color filter and the blue color filter form a gap at the interface between the red color filter and the blue color filter. The upper surface of the display substrate includes a recess corresponding to the gap.

On the upper surface of the display substrate, the recess has a width a on the plane of the upper surface. The spacer 15 has a side in contact with and substantially level with the upper surface, the spacer has a width b on the upper surface. In some embodiments, a≤b. For example, when a plurality of spacers 15 are disposed on the surface of the display substrate, none of them will be received inside the recess due to the fact that a≤b. In other words, when a spacer 15 is arranged on a region corresponding to the recess region, the spacer 15 is substantially outside the recess, and a bottom side of the spacer 15 bridging over the recess. As shown in FIG. 3, the recess is located at a position corresponding to the gap between the blue color filter and the red color filter. The recess has a width a on the plane of the display substrate upper surface. The spacer 15 is on a side of the overlapping portion of the blue color filter distal to the overlapped portion of the black matrix 12. The spacer has a width b on the display substrate upper surface, and a≤b. Having a≤b significantly enhances the surface planarization of the display substrate.

Figure 5:
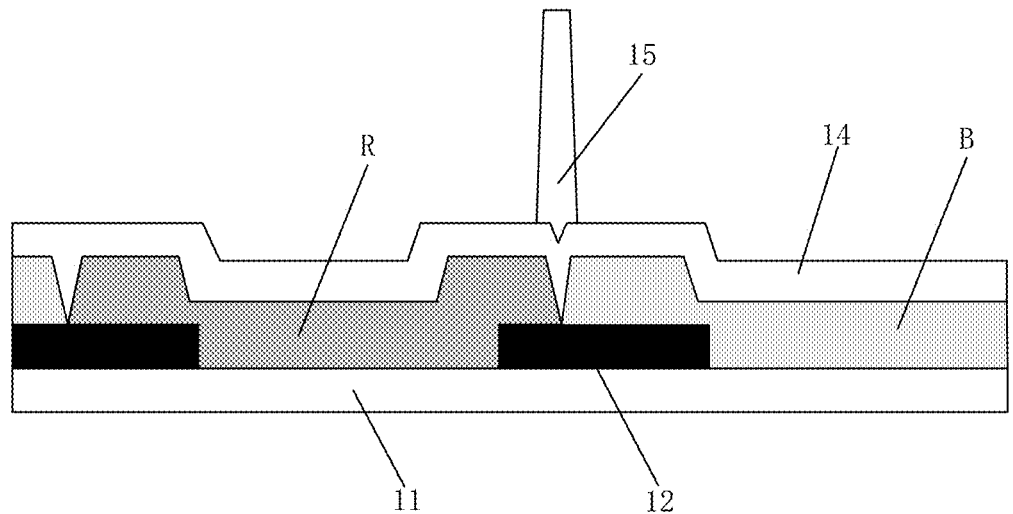
FIG. 5 is a diagram illustrating the structure of a display substrate in some embodiments.

In FIG. 5, the spacer 15 is on a side of one color filter distal to the black matrix 12. For example, the display substrate in FIG. 3 includes a red color filter R adjacent to a blue color filter B, and the spacer 15 is on a side of the overlapping portion of the blue color filter B distal to the overlapped portion of the black matrix 12. Optionally, all spacers 15 in the display substrate are on a side of the overlapping portion of the blue color filter B distal to the overlapped portion of the black matrix 12. Having all spacers 15 on side of a same color filter distal to the base substrate results in a more uniform distribution of spacer elevations on the display substrate. Optionally, the spacers 15 may be disposed on two or more color filters.

The display substrate in FIG. 3 also includes a protective layer 14 on a side of the color filters distal to the base substrate 11, e.g., between the color filters and the spacer 15.

The protective layer 14 may be made of any appropriate material. Optionally, the protective layer 14 is made of a material comprising a polyacrylate polymer.

The color filters may be made of any appropriate material. Optionally, the color filters are made of a material comprising colored resin material, e.g., a polyacrylate polymer mixed with one or more pigments.

Optionally, the color filter has a thickness in the range of about 1.8 μm to about 3.0 μm. Optionally, the color filter has a uniform thickness, e.g., the thickness of the overlapping portion is the same as that of a non-overlapping portion.

Optionally, the overlapping portion of the first color filter extends over the black matrix by a first distance d1 and the adjacent overlapping portion of the second color filter extends over the black matrix by a second distance d2; and d1≠d2. In FIG. 3, the overlapping portion of the blue color filter and the adjacent overlapping portion of the red color filter extends over the black matrix by a second distance d2; and d1≠d2. Optionally, d1>d2. Optionally, the overlapping portion and the adjacent overlapping portion are in contact at least on the upper surface of the black matrix.

Optionally, d1=d2. For example, d1 for a blue color filter is substantially the same as the d2 for a red color filter.

Optionally, the overlapping portion has a thickness substantially the same of that of the adjacent overlapping portion. For example, the overlapping portion of a blue color filter has a thickness substantially the same of that of the adjacent overlapping portion of a red color filter. Optionally, the overlapping portion has a thickness that is different from that of the adjacent overlapping portion.

Optionally, the color filters are patterned by exposing a photoresist using a mask plate. Optionally, the color filters can be coated or printed on the display substrate.

In a display panel having the present display substrate, touch dark non-uniformity is significantly reduced or eliminated to a level of 1 or 2, as compared to a level of 4 to 5 in a conventional display panel.

Moreover, in the present display substrate, at least one of the two adjacent color filters has an overlapping portion on a side of an overlapped portion of the black matrix distal to the base substrate, and the spacers disposed on the display substrate surface are in contact with and substantially level with the surface. By having this novel design, the surface planarization of the display substrate is greatly enhanced, the spacer elevations distribution throughout the display substrate is significantly more uniform. The recess in the region corresponding to the interface between two adjacent color filters has a much smaller dimension as compared to that of the convention display substrate. For example, the width and depth of the recess is much reduced. As a result, the liquid crystal layer around the recess region can recover quickly upon the withdrawal of external touch, resulting in a highly uniform touch darkness. Due to a much smaller recess dimension, the amount of liquid crystal required for the display panel can be reduced, lowering the manufacturing costs.

Figure 4:
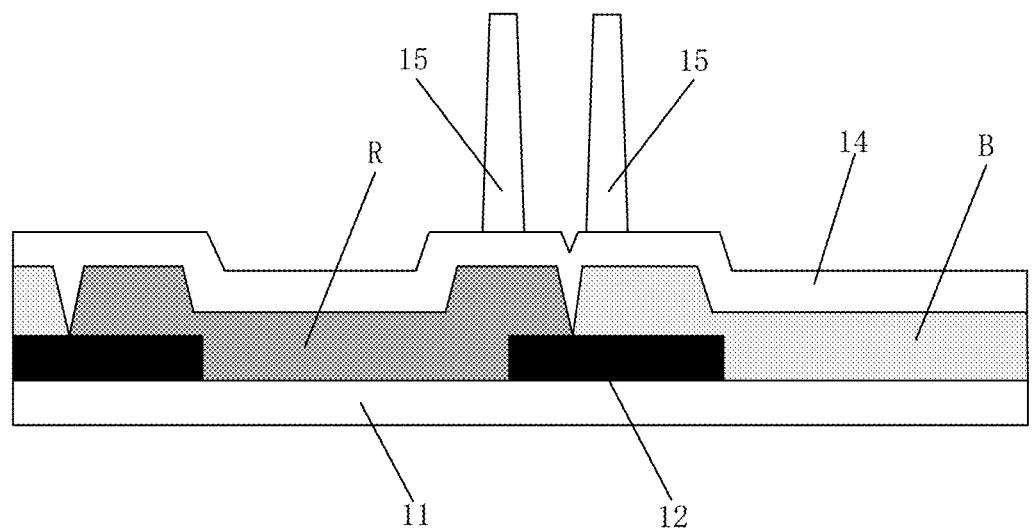
FIG. 4 is a diagram illustrating the structure of a display substrate in some embodiments.

FIG. 4 is a diagram illustrating the structure of a display substrate in some embodiments. Referring to FIG. 4, the display substrate in the embodiment includes two spacers each on one of the adjacent color filters. For example, one spacer is on a side of the overlapping portion distal to the overlapped portion, and another is on a side of the adjacent overlapping portion distal to the adjacent overlapped portion.

Specifically, the display substrate in FIG. 4 includes two adjacent color filters, one red color filter R and one blue color filter B. The blue color filter B has an overlapping portion on a side of an overlapped portion of the black matrix distal to the base substrate, and the red color filter R has an adjacent overlapping portion on a side of an adjacent overlapped portion of the black matrix distal to the base substrate. As shown in FIG. 4, the display substrate has two spacers 15, one on a side of the overlapping portion of the blue color filter distal to the overlapped portion of the black matrix 12, and the second one on a side of the adjacent overlapping portion of the red color filter distal to the adjacent overlapped portion of the black matrix 12.

In the present display substrate, at least one of the two adjacent color filters has an overlapping portion on a side of an overlapped portion of the black matrix distal to the base substrate, and the spacers disposed on the display substrate surface are in contact with and substantially level with the surface. By having this novel design, the surface planarization of the display substrate is greatly enhanced, the spacer elevations distribution throughout the display substrate is significantly more uniform. The recess in the region corresponding to the interface between two adjacent color filters has a much smaller dimension as compared to that of the convention display substrate. For example, the width and depth of the recess is much reduced. As a result, the liquid crystal layer around the recess region can recover quickly upon the withdrawal of external touch, resulting in a highly uniform touch darkness. Due to a much smaller recess dimension, the amount of liquid crystal required for the display panel can be reduced, lowering the manufacturing costs. In a display panel having the present display substrate, touch dark non-uniformity is significantly reduced or eliminated to a level of 1 or 2, as compared to a level of 4 to 5 in a conventional display panel.

FIG. 5 is a diagram illustrating the structure of a display substrate in some embodiments. Referring to FIG. 5, the display substrate in the embodiment includes a spacer 15 over the recess (i.e., on a side of the recess distal to the black matrix 12), and is substantially outside the recess.

Specifically, the display substrate in FIG. 5 includes two adjacent color filters, one red color filter R and one blue color filter B. The blue color filter B has an overlapping portion on a side of an overlapped portion of the black matrix distal to the base substrate, and the red color filter R has an adjacent overlapping portion on a side of an adjacent overlapped portion of the black matrix distal to the base substrate. As shown in FIG. 5, the display substrate has a spacer 15 on a side of the recess distal to the black matrix 12, the recess corresponding to the interface between the blue color filter and the red color filter.

In the display substrate as shown in FIG. 5, the recess has a width a and each spacer has a width b on the surface of the display substrate. As shown in FIG. 5, a<b. The spacer 15 is arranged on a region above the recess region, the spacer 15 is substantially outside the recess, and a bottom side of the spacer 15 bridging over the recess.

In the present display substrate, at least one of the two adjacent color filters has an overlapping portion on a side of an overlapped portion of the black matrix distal to the base substrate, and the spacers disposed on the display substrate surface are in contact with and substantially level with the surface. By having this novel design, the surface planarization of the display substrate is greatly enhanced, the spacer elevations distribution throughout the display substrate is significantly more uniform. The recess in the region corresponding to the interface between two adjacent color filters has a much smaller dimension as compared to that of the convention display substrate. For example, the width and depth of the recess is much reduced. As a result, the liquid crystal layer around the recess region can recover quickly upon the withdrawal of external touch, resulting in a highly uniform touch darkness. Due to a much smaller recess dimension, the amount of liquid crystal required for the display panel can be reduced, lowering the manufacturing costs. In a display panel having the present display substrate, touch dark non-uniformity is significantly reduced or eliminated to a level of 1 or 2, as compared to a level of 4 to 5 in a conventional display panel.

Figure 6:
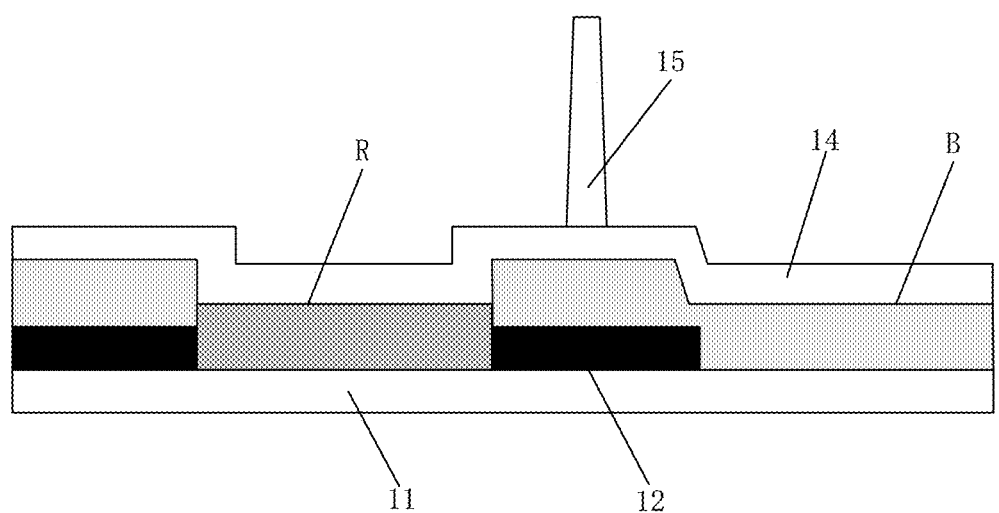
FIG. 6 is a diagram illustrating the structure of a display substrate in some embodiments.

FIG. 6 is a diagram illustrating the structure of a display substrate in some embodiments. Referring to FIG. 6, the overlapping portion of one of the two adjacent color filters substantially covers an entire surface of the black matrix 12. The spacer 12 is on a side of the overlapping portion distal to the black matrix 12.

Specifically, the blue color filter B in FIG. 6 has an overlapping portion that extends throughout the entire surface of the black matrix 12. The spacer 15 is on a side of the overlapping portion of the blue color filter B distal to the black matrix 12.

In the present display substrate, at least one of the two adjacent color filters has an overlapping portion on a side of an overlapped portion of the black matrix distal to the base substrate, and the spacers disposed on the display substrate surface are in contact with and substantially level with the surface. By having this novel design, the surface planarization of the display substrate is greatly enhanced, the spacer elevations distribution throughout the display substrate is significantly more uniform. The recess in the region corresponding to the interface between two adjacent color filters has a much smaller dimension as compared to that of the convention display substrate. For example, the width and depth of the recess is much reduced. As a result, the liquid crystal layer around the recess region can recover quickly upon the withdrawal of external touch, resulting in a highly uniform touch darkness. Due to a much smaller recess dimension, the amount of liquid crystal required for the display panel can be reduced, lowering the manufacturing costs. In a display panel having the present display substrate, touch dark non-uniformity is significantly reduced or eliminated to a level of 1 or 2, as compared to a level of 4 to 5 in a conventional display panel.

In some embodiments, the display substrate includes a base substrate having at least a first region, a second region adjacent to the first region, a third region adjacent to the second region and spaced apart from the first region by the second region on one side, and a black matrix region; a black matrix in the black matrix region on the base substrate comprising a plurality of rows and a plurality of columns intersecting each other; a first color filter layer in a first region and extending into the black matrix region, the first color filter layer overlapping with the black matrix throughout the plurality of columns of the black matrix; a second color filter layer in the second region; and a third color filter layer in the third region.

Figure 10A:
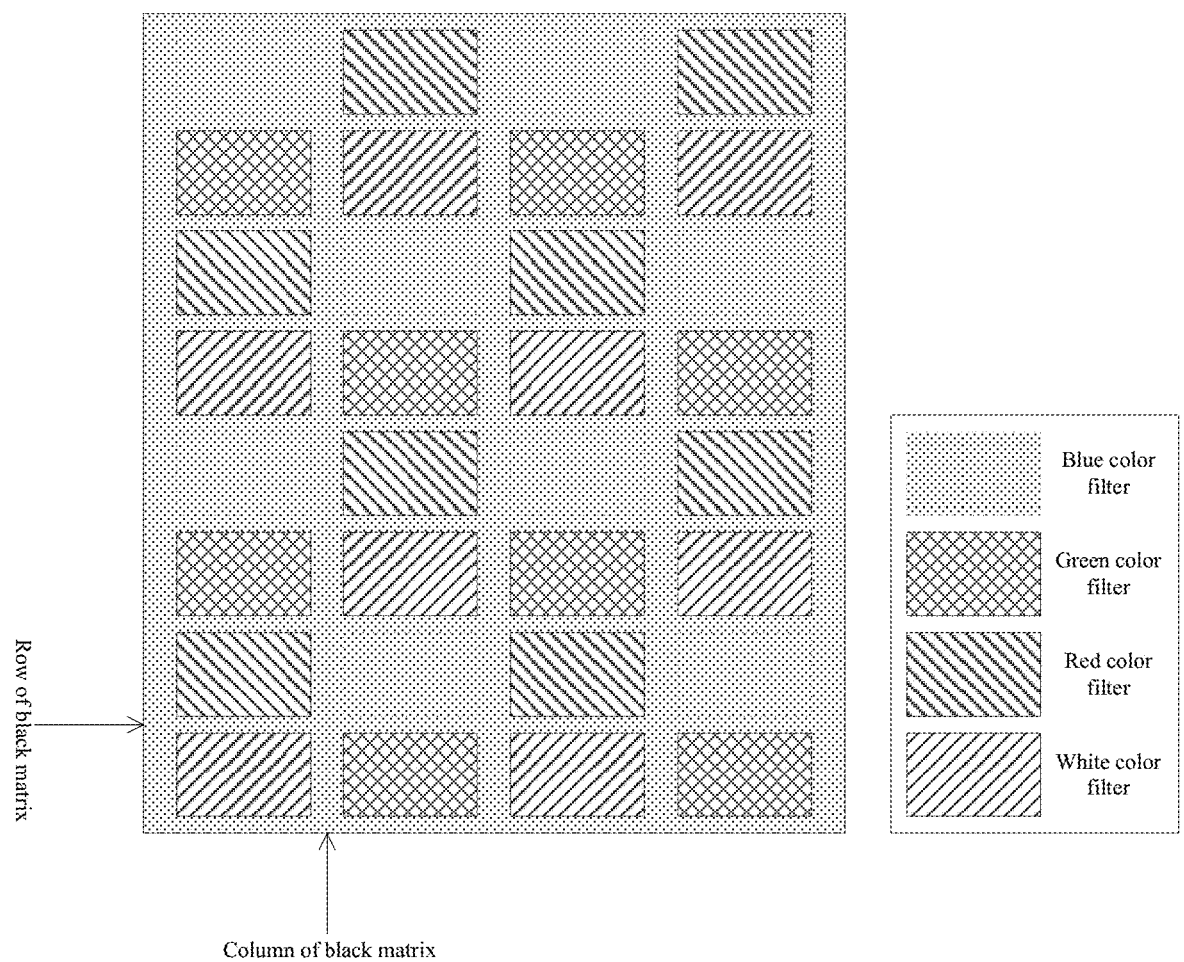
FIG. 10A is a diagram illustrating the structure of a display substrate in some embodiments.
Figure 10B:
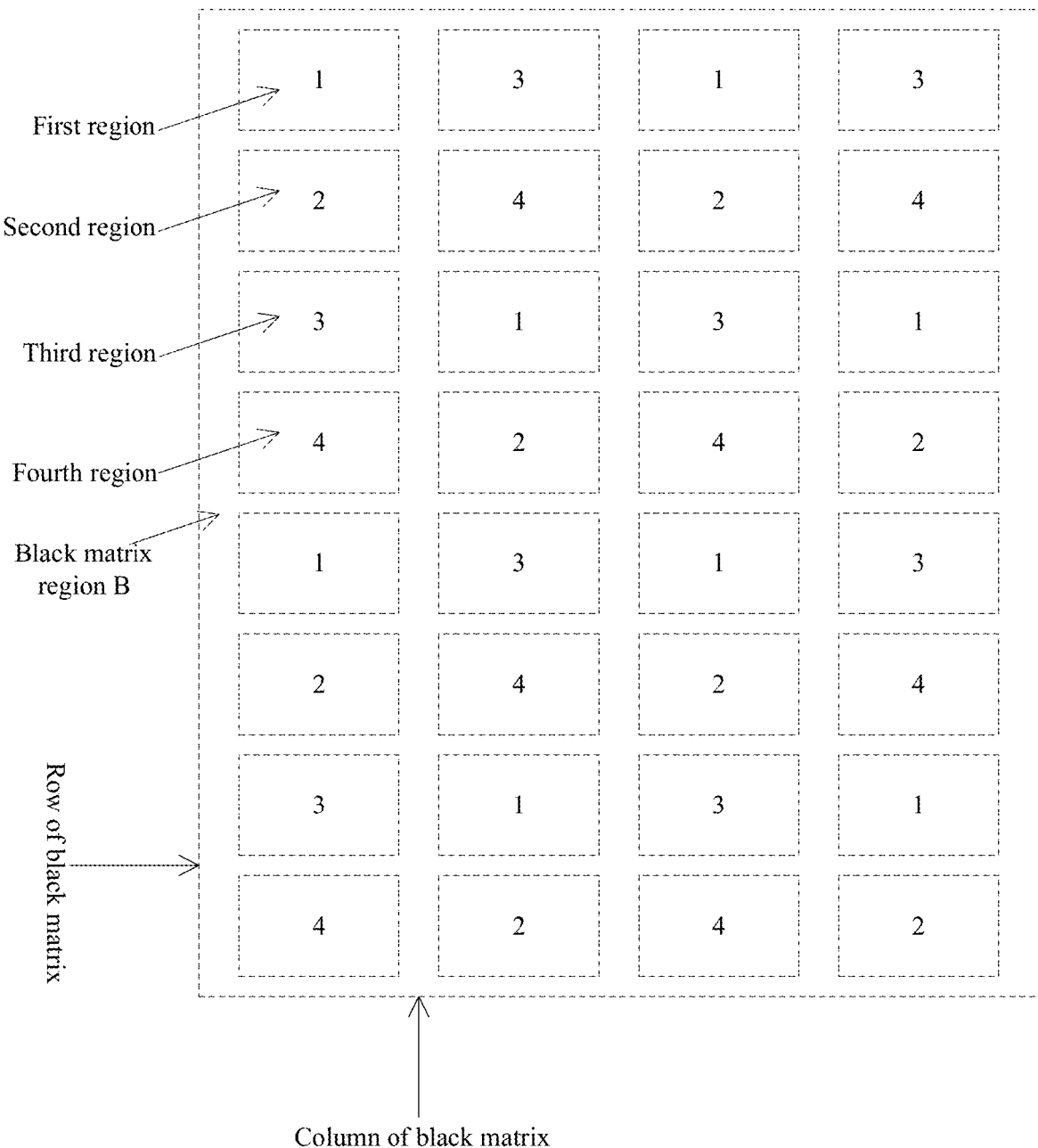
FIG. 10B illustrates various regions of the display substrate in the embodiment.

FIG. 10A is a diagram illustrating the structure of a display substrate in some embodiments. FIG. 10B illustrates various regions of the display substrate in the embodiment. Referring to FIG. 10B, the display substrate in the embodiment include a base substrate having the first region 1, the second region 2, the third region 3, and the black matrix region B. The first region 1 corresponds to a first pixel region in a corresponding array substrate, the second region 2 corresponds to a second pixel region in the array substrate, the third region 3 corresponds to a third pixel region in the corresponding array substrate, and the black matrix region B is a region occupied by the black matrix on the display substrate (e.g., a color filter substrate). As shown in FIG. 10B, the black matrix includes a plurality of rows and a plurality of columns intersecting each other. Optionally, the display substrate further includes a fourth region 4 corresponding to a fourth pixel region in the corresponding array substrate. For example, the first region 1 may correspond to a blue pixel region, the second region 2 may correspond to a green pixel region, the third region 3 may correspond to a red pixel region, and the fourth region 4 may correspond to a white pixel region.

Along the column direction in FIG. 10B, the second region 2 is adjacent to the first region 1, the third region 3 is adjacent to the second region 2, the fourth region is adjacent to the third region 3. The third region 3 is spaced apart from the first region 1 by the second region 2 on one side, and spaced apart from the first region 1 by the fourth region 4 on the other side. The first region 1 is adjacent to the second region 2 on one side and adjacent to the fourth region 4 on the other side.

Referring to FIG. 10A, the first color filter layer in the embodiment is a blue color filter layer, the second color filter layer is a green color filter layer, the third color filter layer is a red color filter layer, and the fourth color filter layer is a white color filter layer. As shown in FIG. 10A, the first color filter layer is in the first region, and extends into the black matrix region. Optionally, the first color filter layer overlaps with the black matrix throughout the plurality of columns of the black matrix (e.g., the first color filter layer is in at least the first region and column portions of the black matrix region). The second color filter layer is in the second region, the third color filter layer is in the third region, and the fourth color filter layer is in the fourth region. Optionally, the first color filter layer overlaps with the black matrix throughout the plurality of rows and the plurality of columns of the black matrix (as shown in FIG. 10A). Optionally, the first color filter layer completely covers an entire area of the black matrix region throughout the plurality of rows and the plurality of columns of the black matrix (as shown in FIG. 10A).

In some embodiments, the first color filter layer abuts the second color filter layer at an interface between the first color filter layer and the second color filter layer along a column direction of the display substrate. That is, there is no gap between the first color filter layer and the second color filter layer, the first color filter layer and the second color filter layer fill any space between them. Optionally, the interface is within the black matrix region (e.g., within a row region of the black matrix). Optionally, the interface is outside the black matrix region (e.g., the first color filter layer alone fills in any space between the first color filter layer and the second color filter layer along the column direction of the display substrate). Optionally, the interface is at an interface between the black matrix region and the second region.

In some embodiments, the first color filter layer extends into an interface between the second color filter layer and the third color filter layer, the first color filter layer abuts the second color filter layer on a first side and abuts the third color filter layer on a second side at the interface. That is, there is no gap between the second color filter layer and the third color filter layer. Optionally, the first color filter layer fills in any space between them. Optionally, the first color filter layer, the second color filter layer, and the third color filter layer fill in any space between the second color filter layer and the third color filter layer.

In some embodiments, the first color filter layer extends into an interface between the fourth color filter layer and the third color filter layer, the first color filter layer abuts the fourth color filter layer on a first side and abuts the third color filter layer on a second side at the interface. That is, there is no gap between the fourth color filter layer and the third color filter layer. Optionally, the first color filter layer fills in any space between them. Optionally, the first color filter layer, the fourth color filter layer, and the third color filter layer fill in any space between the fourth color filter layer and the third color filter layer.

In some embodiments, the display substrate further includes a protective layer at an interface between the second color filter layer and the third color filter layer, the protective layer abuts the second color filter layer on a first side and abuts the third color filter layer on a second side at the interface. That is, there is no gap between the second color filter layer and the third color filter layer. Optionally, the protective layer fills in any space between them. Optionally, the protective layer, the second color filter layer, and the third color filter layer fill in any space between the second color filter layer and the third color filter layer.

In some embodiments, the display substrate further includes a protective layer at an interface between the fourth color filter layer and the third color filter layer, the protective layer abuts the fourth color filter layer on a first side and abuts the third color filter layer on a second side at the interface. That is, there is no gap between the fourth color filter layer and the third color filter layer. Optionally, the protective layer fills in any space between them. Optionally, the protective layer, the fourth color filter layer, and the third color filter layer fill in any space between the second color filter layer and the third color filter layer.

In some embodiments, the second color filter layer and the third color filter layer abut each other at an interface between the second color filter layer and the third color filter layer. That is, there is no gap between the second color filter layer and the third color filter layer. Optionally, the second color filter layer fills in any space between them. Optionally, the third color filter layer fills in any space between them. Optionally, the second color filter layer and the third color filter layer together fill in any space between the second color filter layer and the third color filter layer.

In some embodiments, the fourth color filter layer and the third color filter layer abut each other at an interface between the fourth color filter layer and the third color filter layer. That is, there is no gap between the fourth color filter layer and the third color filter layer. Optionally, the fourth color filter layer fills in any space between them. Optionally, the third color filter layer fills in any space between them. Optionally, the fourth color filter layer and the third color filter layer together fill in any space between the second color filter layer and the third color filter layer.

In some embodiments, the display substrate (e.g., a display substrate as shown in FIG. 10A) further includes a spacer layer having a plurality of spacers in the black matrix region, the plurality of spacers are substantially on a same level with each other.

Figure 12A:
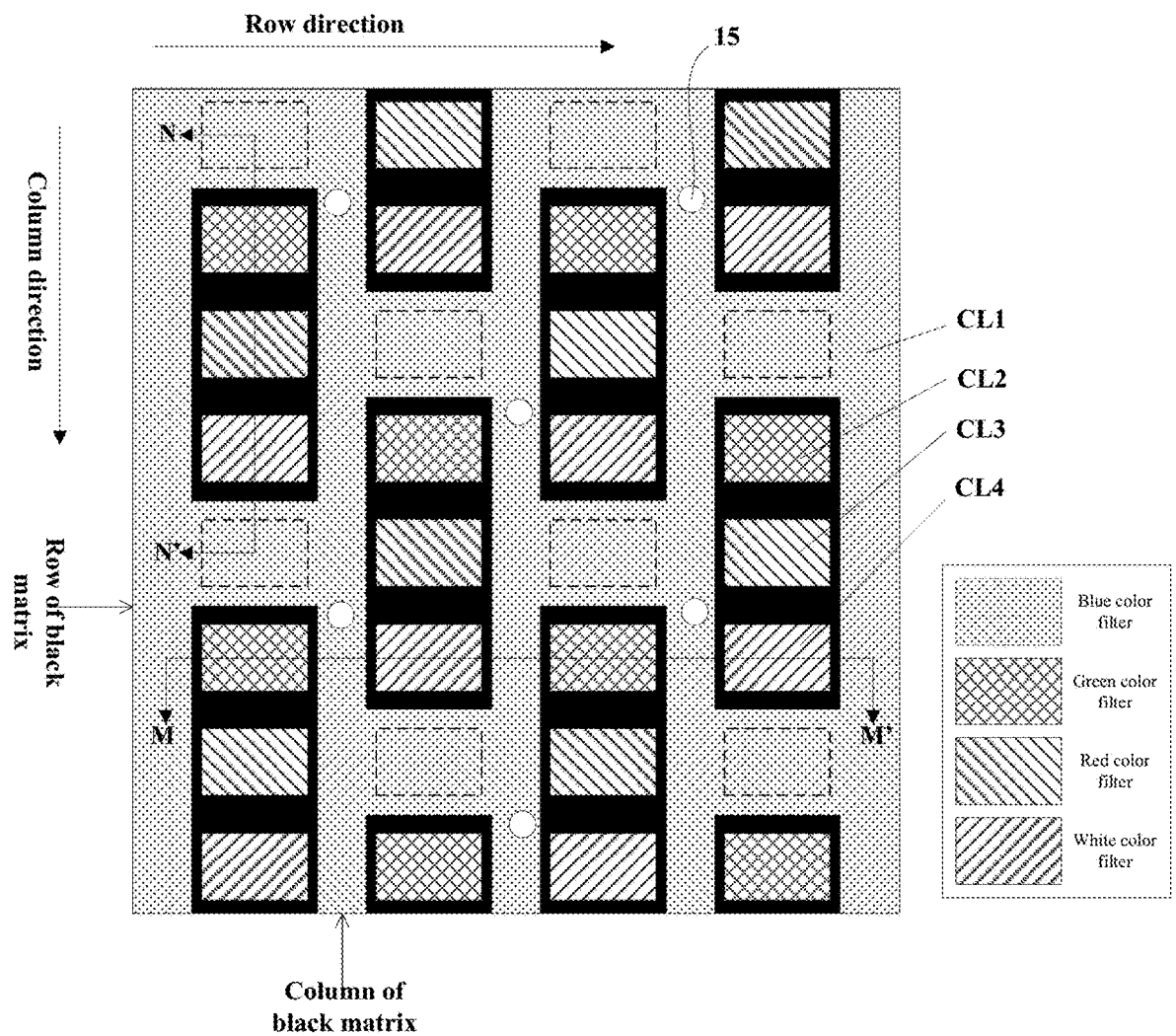
FIG. 12A is a diagram illustrating the structure of a display substrate in some embodiments according to the present disclosure.
Figure 12B:
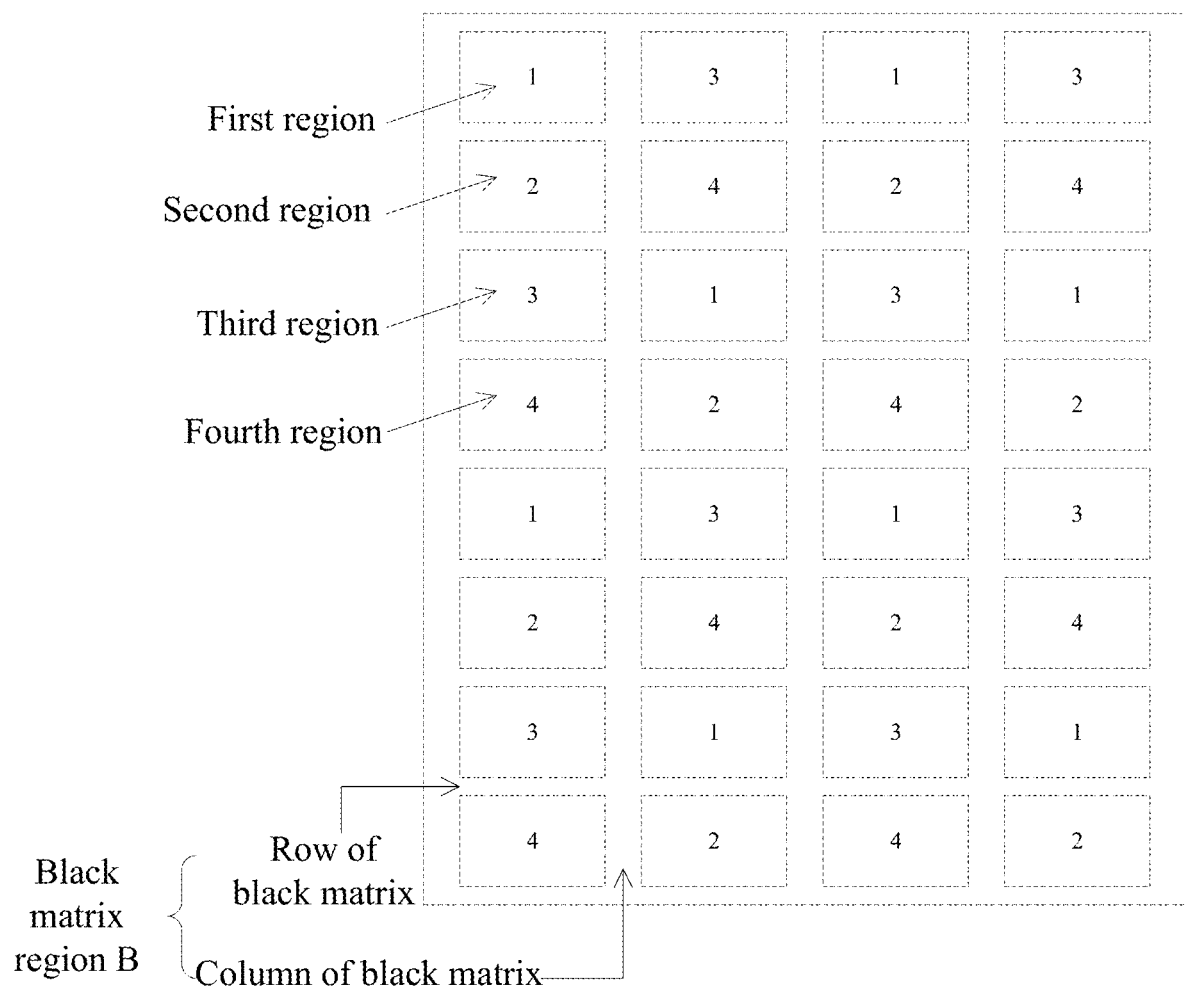
FIG. 12B illustrates various regions of the display substrate in the embodiment.
Figure 12C:
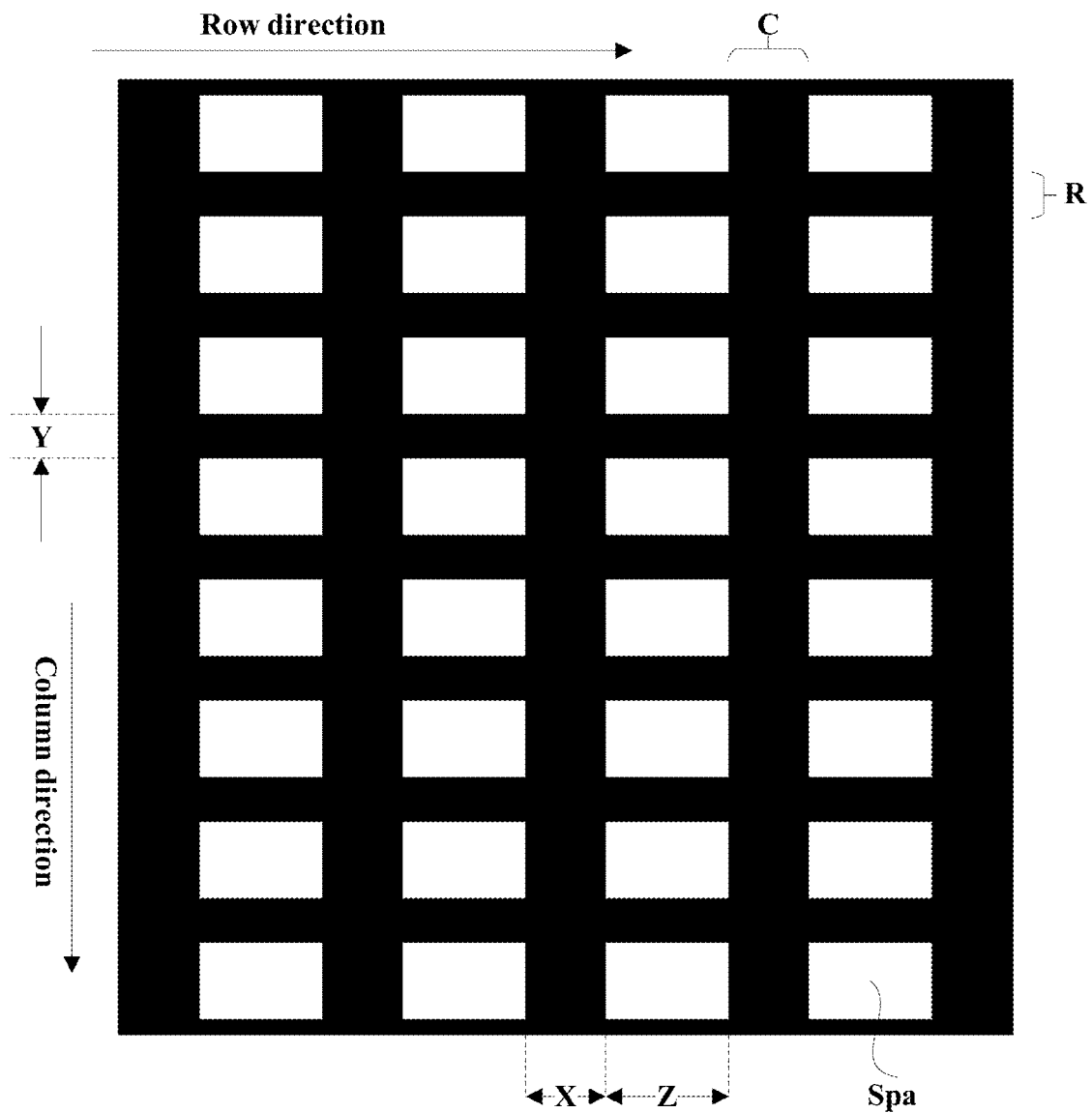
FIG. 12C illustrates the structure of a black matrix in the display substrate of FIG. 12A.
Figure 12D:
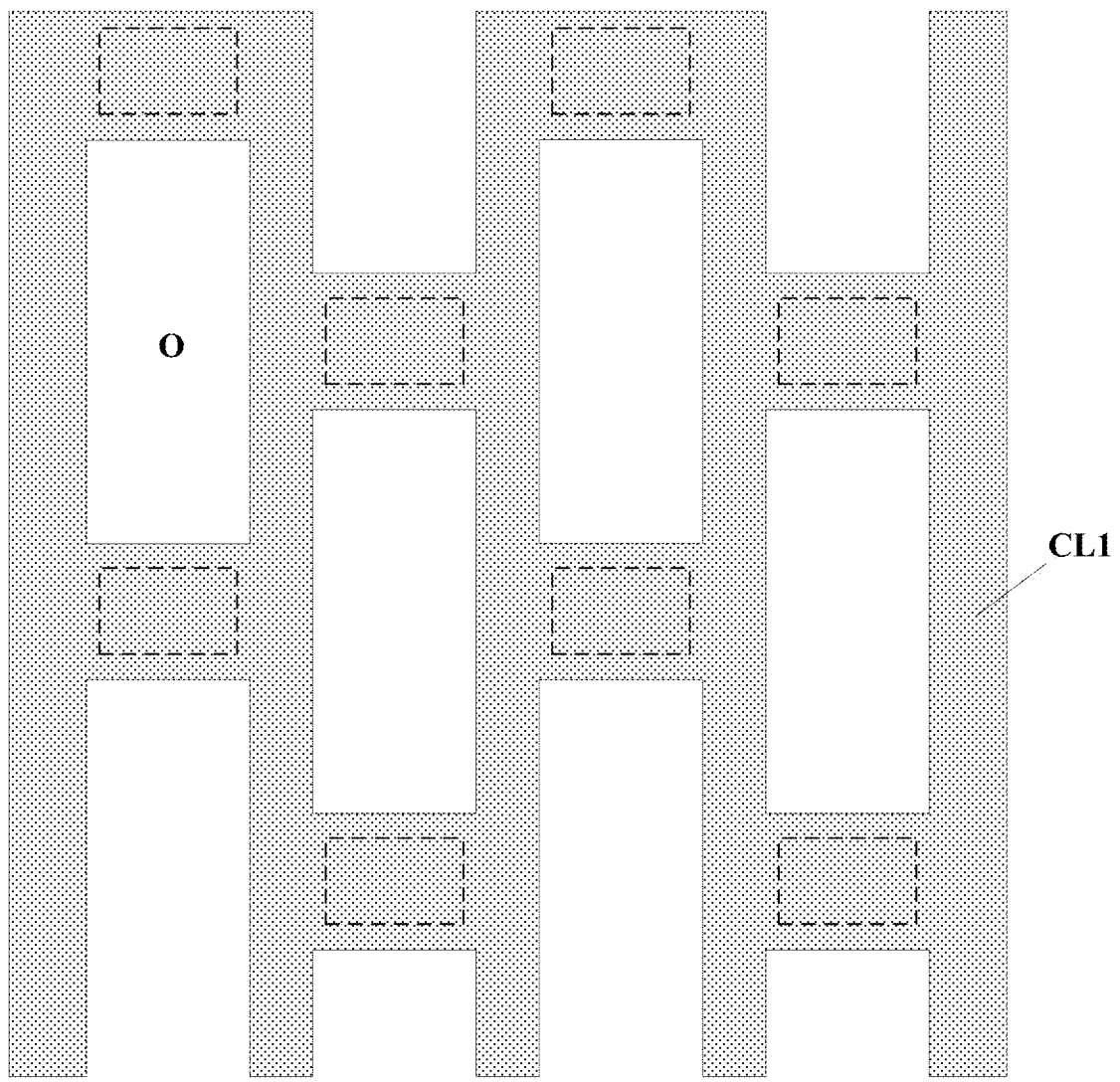
FIG. 12D illustrates the structure of a first color filter layer in the display substrate of FIG. 12A.
Figure 12E:
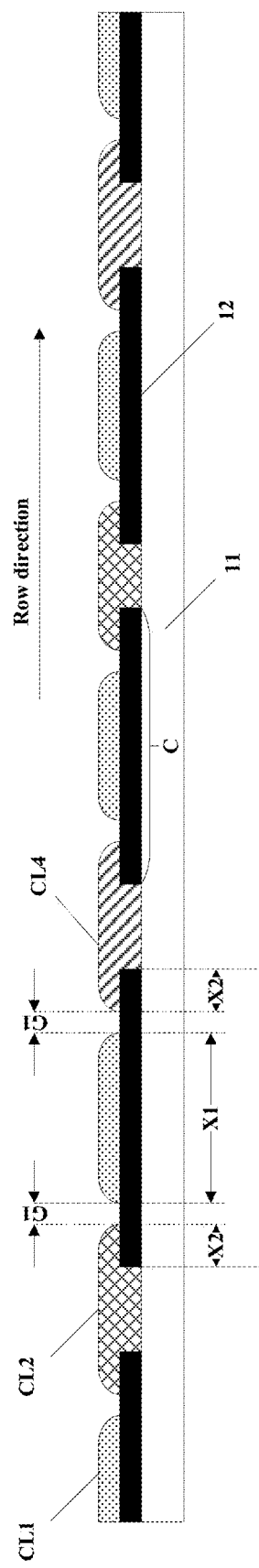
FIG. 12E is a cross-sectional view along a M-M' line in FIG. 12A.
Figure 12F:
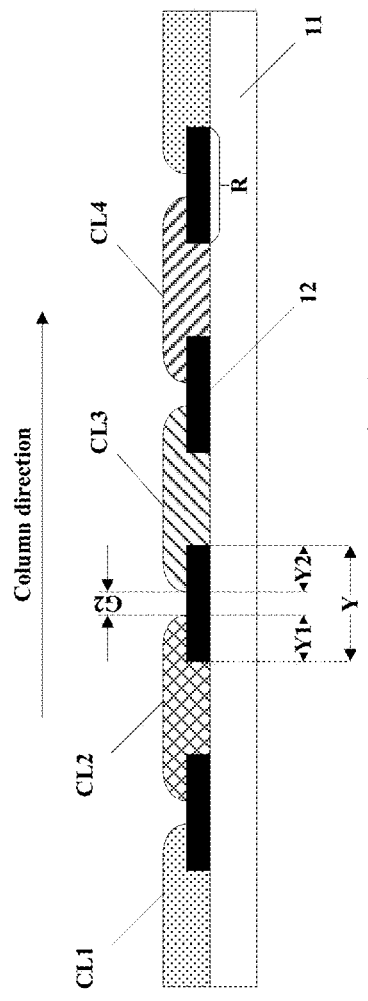
FIG. 12F is a cross-sectional view along a N-N' line in FIG. 12A.

In some embodiments, the display substrate having at least a first region corresponding to a subpixel of a first color, a second region adjacent to the first region and corresponding to a subpixel of a second color, a third region adjacent to the second region and spaced apart from the first region by the second region on one side, the third region corresponding to a subpixel of a third color, and a black matrix region outside the first region, the second region, and the third region. FIG. 12A is a diagram illustrating the structure of a display substrate in some embodiments. FIG. 12B illustrates various regions of the display substrate in the embodiment. FIG. 12C illustrates the structure of a black matrix in the display substrate of FIG. 12A. FIG. 12D illustrates the structure of a first color filter layer in the display substrate of FIG. 12A. FIG. 12E is a cross-sectional view along a M-M' line in FIG. 12A. FIG. 12F is a cross-sectional view along a N-N' line in FIG. 12A. Referring to FIGS. 12A to 12E, the display substrate in the embodiment include a base substrate 11 having the first region 1, the second region 2, the third region 3, and the black matrix region B. The first region 1 corresponds to a subpixel of a first color, the second region 2 corresponds to a subpixel of a second color, the third region 3 corresponds to a subpixel of a third color, and the black matrix region B is a region occupied by the black matrix 12 on the display substrate (e.g., a color filter substrate). As shown in FIG. 12C, the black matrix includes a plurality of rows R and a plurality of columns C intersecting each other. The third region 3 is adjacent to the second region 2 and spaced apart from the first region 1 by the second region 2 on one side. Optionally, the display substrate further includes a fourth region 4 corresponding to a subpixel of a fourth color. The third region 3 is spaced apart from the first region 1 by the second region 2 on a first side and spaced apart from the first region 1 by the fourth region 4 on a second side. For example, the first region 1 may correspond to a blue subpixel, the second region 2 may correspond to a green subpixel, the third region 3 may correspond to a red subpixel, and the fourth region 4 may correspond to a white subpixel.

Referring to FIG. 12B, each of the first region 1, the second region 2, and the third region 3 has a substantially rectangular shape. Optionally, a longitudinal side of the substantially rectangular shape is substantially parallel to the plurality of columns of the black matrix. Optionally, a lateral side of the substantially rectangular shape is substantially parallel to the plurality of rows of the black matrix. As used herein, the term "substantially parallel" means that an angle is in the range of 0 degree to approximately 45 degrees, e.g., 0 degree to approximately 5 degrees, 0 degree to approximately 10 degrees, 0 degree to approximately 15 degrees, 0 degree to approximately 20 degrees, 0 degree to approximately 25 degrees, 0 degree to approximately 30 degrees.

The area circled by dotted lines in FIG. 12A represents a subpixel aperture for the subpixel of a first color, also corresponding to the first region 1. The display substrate in some embodiments includes a first color filter layer CL1, a second color filter layer CL2, and a third color filter layer CL3. Optionally, the display substrate further includes a fourth color filter layer CL4. Referring to FIG. 12D, the first color filter layer CL1 has in some embodiments a net structure with a plurality of openings O. The first color filter layer CL1 in some embodiments includes a first portion in the first region (the area circled by the dotted lines) and a second portion in the black matrix region B. Referring to FIG. 12A, the first color filter layer CL1 in some embodiments substantially covering the plurality of columns C of the black matrix 12. As used herein, the term "substantially covers" refers to one object (or an orthographic projection thereof) being at least 50%, at least 60%, at least 70%, at least 80%, at least 90%, at least 95%, at least 99%, or 100% covered by another object (or an orthographic projection thereof).

Referring to FIG. 12A and FIG. 12B, the second color filter layer CL2 is disposed in the second region 2, and the third color filter layer CL3 is disposed in the third region 3. The second color filter layer CL2 and the third color filter layer CL3 are both in the plurality of openings O, and are respectively spaced apart from the first color filter layer CL1.

Referring to FIG. 12A, FIG. 12D, and FIG. 12F, in some embodiments, the first color filter layer CL1 is absent in a region between the second color filter layer CL2 and the third color filter layer CL3 in the plurality of openings O.

Figure 12G:
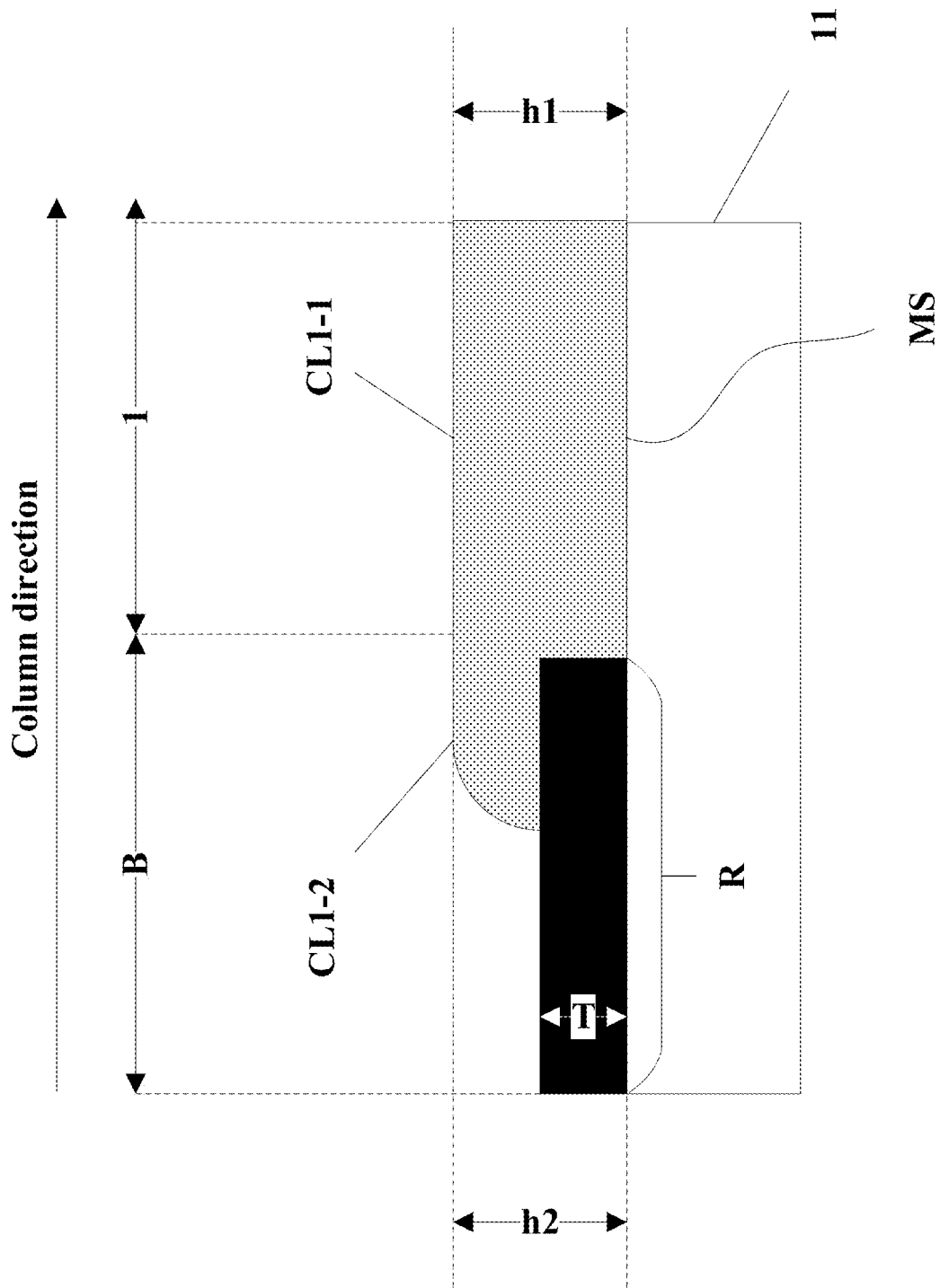
FIG. 12G is a partial cross-sectional view of a display substrate in some embodiments according to the present disclosure.

FIG. 12G is a partial cross-sectional view of a display substrate in some embodiments according to the present disclosure. Referring to FIG. 12G, a surface of the first portion CL1-1 of the first color filter layer in the first region 1 away from the base substrate 11 has a height h1 relative to the base substrate 11 (e.g., relative to a main surface MS of the base substrate 11). A surface of the second portion CL1-2 of the first color filter layer in the back matrix region B away from the base substrate 11 has a height h2 relative to the base substrate 11 (e.g., relative to the main surface MS of the base substrate 11). Optionally, the height h1 and the height h2 are substantially the same. As used herein, the term "substantially the same" refers to a difference between two values not exceeding 30%, e.g., not exceeding 25%, not exceeding 20%, not exceeding 15%, not exceeding 10%, not exceeding 8%, not exceeding 6%, not exceeding 4%, not exceeding 2%, not exceeding 1%, not exceeding 0.5%, not exceeding 0.1%, not exceeding 0.05%, and not exceeding 0.01%.

In some embodiments, the edge of the color filter layer has a slope angle, as shown in FIGS. 12E to 12G. In some embodiments, the height h1 refers to a maximum height between a surface of the first portion CL1-1 of the first color filter layer in the first region 1 at a point most away from the base substrate 11 relative to the base substrate 11 (e.g., relative to a main surface MS of the base substrate 11). In some embodiments, the height h2 refers to a maximum height between a surface of the second portion CL1-2 of the first color filter layer in the back matrix region B at a point most away from the base substrate 11 relative to the base substrate 11 (e.g., relative to a main surface MS of the base substrate 11). Optionally, the height h1 and the height h2 are within 30% of each other, e.g., within 25%, within 20%, within 15%, within 10%, within 5%, within 1%, within 0.1%, of each other.

In some embodiments, the first portion CL1-1 of the first color filter layer in the first region 1 has a first thickness, and the second portion CL1-2 of the first color filter layer in the back matrix region B and the black matrix 12 between the second portion CL1-2 and the base substrate 11 in combination have a second thickness. Optionally, the first thickness and the second thickness are within 30% of each other, e.g., within 25%, within 20%, within 15%, within 10%, within 5%, within 1%, within 0.1%, of each other.

As shown in FIG. 12G, the black matrix 12 between the second portion CL1-2 and the base substrate 11 has a thickness T. Optionally, a difference between the height h2 and the height h1 is less than or equal to T, but greater than or equal to 0. For example, $0 \leq (h2-h1) \leq T$. Optionally, the second height h2 is greater than or equal to the first height h1.

Referring to FIG. 12E, a respective one of the plurality of columns C of the black matrix 12 has a width X along the row direction of the display substrate. In some embodiments, the respective one of the plurality of columns C of the black matrix 12 is substantially covered by the first color filter layer CL1. Optionally, the first color filter layer covers 80% to 90% (80% to 84%, 84% to 88%, and 88% to 90%) of a respective one of the plurality of columns C of the black matrix 12 along the row direction. For example, as shown in FIG. 12E, a width X1 covered by the first color filter layer CL1 is 80% to 90% of the width X.

In some embodiments, a color filter layer other than the first color filter layer and directly adjacent to the respective one of the plurality of columns of the black matrix covers 1% to 10% of the respective one of the plurality of columns of the black matrix along the row direction. Referring to FIG. 12E, the respective one of the plurality of columns C of the black matrix 12 is substantially covered by the first color filter layer CL1, but also partially covered by the second color filter layer CL2 on one side and the fourth color filter layer CL4 on the other side. The combined width X2 covered by the second color filter layer CL2 and the fourth color filter layer CL4 is 1% to 10% (e.g., 1% to 4%, 4% to 6%, and 6% to 10%) of the width X.

In some embodiments, 0% to 5% of respective one of the plurality of columns of the black matrix along the row direction is uncovered by any color filter layer. Referring to FIG. 12E, the first color filter layer CL1 on top of the respective one of the plurality of columns C of the black matrix 12 is spaced apart by a gap G1 from an adjacent color filter layer on top of the respective one of the plurality of columns C of the black matrix 12. The gap G1 in the black matrix region and on a side of the respective one of the plurality of columns C of the black matrix 12 away from the base substrate 11. For example, the first color filter layer CL1 on top of the respective one of the plurality of columns C of the black matrix 12 is spaced apart by a gap G1 from the second color filter layer CL2 on top of the respective one of the plurality of columns C of the black matrix 12. The first color filter layer CL1 on top of the respective one of the plurality of columns C of the black matrix 12 is also spaced apart by a gap G1 from the fourth color filter layer CL2 on top of the respective one of the plurality of columns C of the black matrix 12. The combined width of the gap G1 is 0% to 5% (e.g., 0% to 1%, 1% to 3%, and 3% to 5%) of the width X.

In some embodiments, at least one of two color filter layers directly adjacent to a respective one of the plurality of rows of the black matrix at least partially covers the respective one of the plurality of rows of the black matrix. In particular, when the two color filter layers are color filter layers corresponding to subpixels other than a subpixel of white color (for example, the two color filter layers are non-white color filter layers), each of the two color filter layers directly adjacent to the respective one of the plurality of rows of the black matrix partially covers the respective one of the plurality of rows of the black matrix. Referring to FIG. 12F, each of the second color filter layer CL2 and the third color filter layer CL3 directly adjacent to a respective one of the plurality of rows R of the black matrix 12 partially covers the respective one of the plurality of rows R of the black matrix 12. The second color filter layer CL2 and the third color filter layer CL3 on top of the respective one of the plurality of rows R of the black matrix 12 are spaced apart from each other by a gap G2. The gap G2 is in the black matrix region B and on a side of the respective one of the plurality of rows R of the black matrix 12 away from the base substrate 11.

Figure 13A:
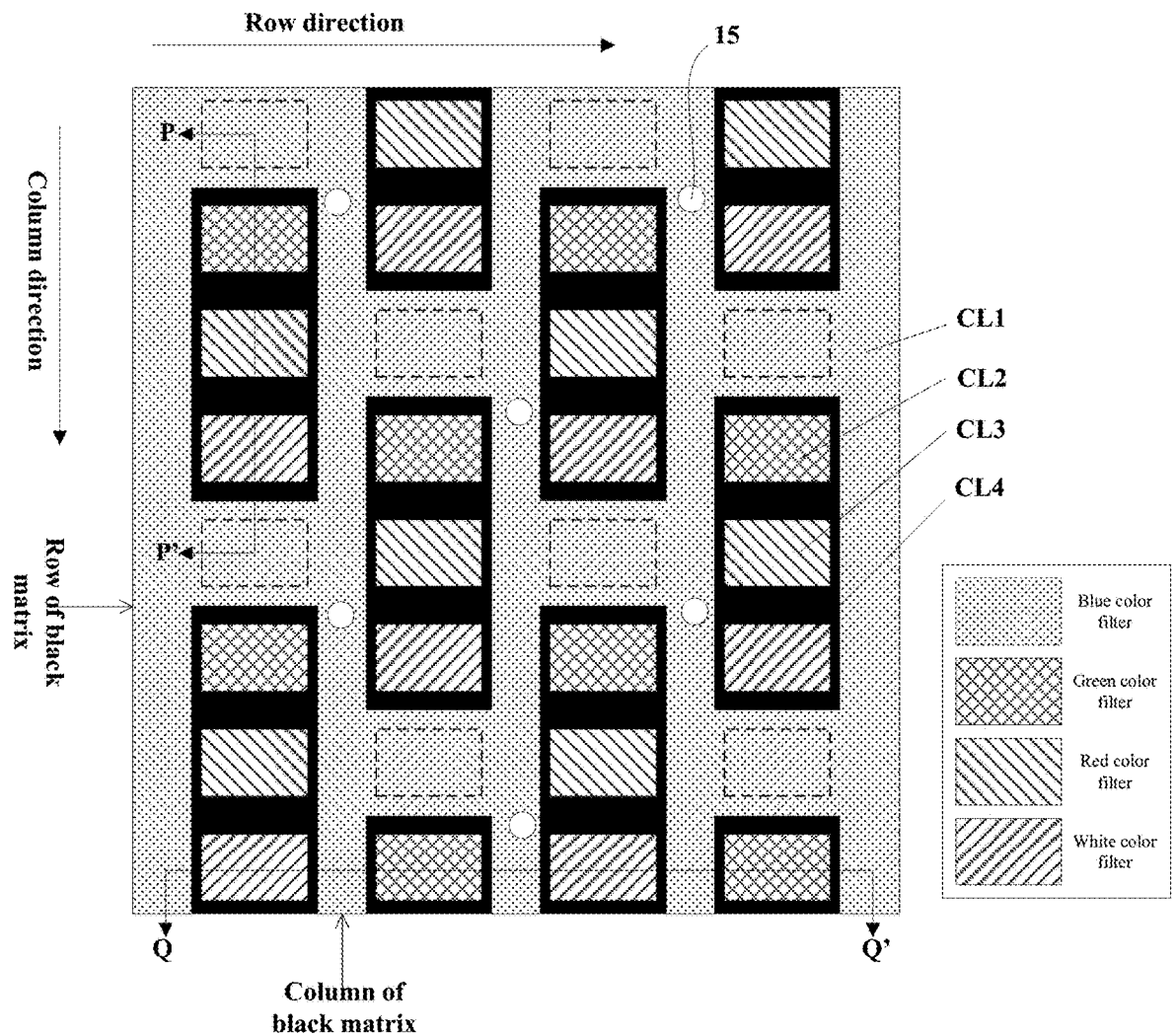
FIG. 13A is a diagram illustrating the structure of a display substrate in some embodiments according to the present disclosure.
Figure 13B:
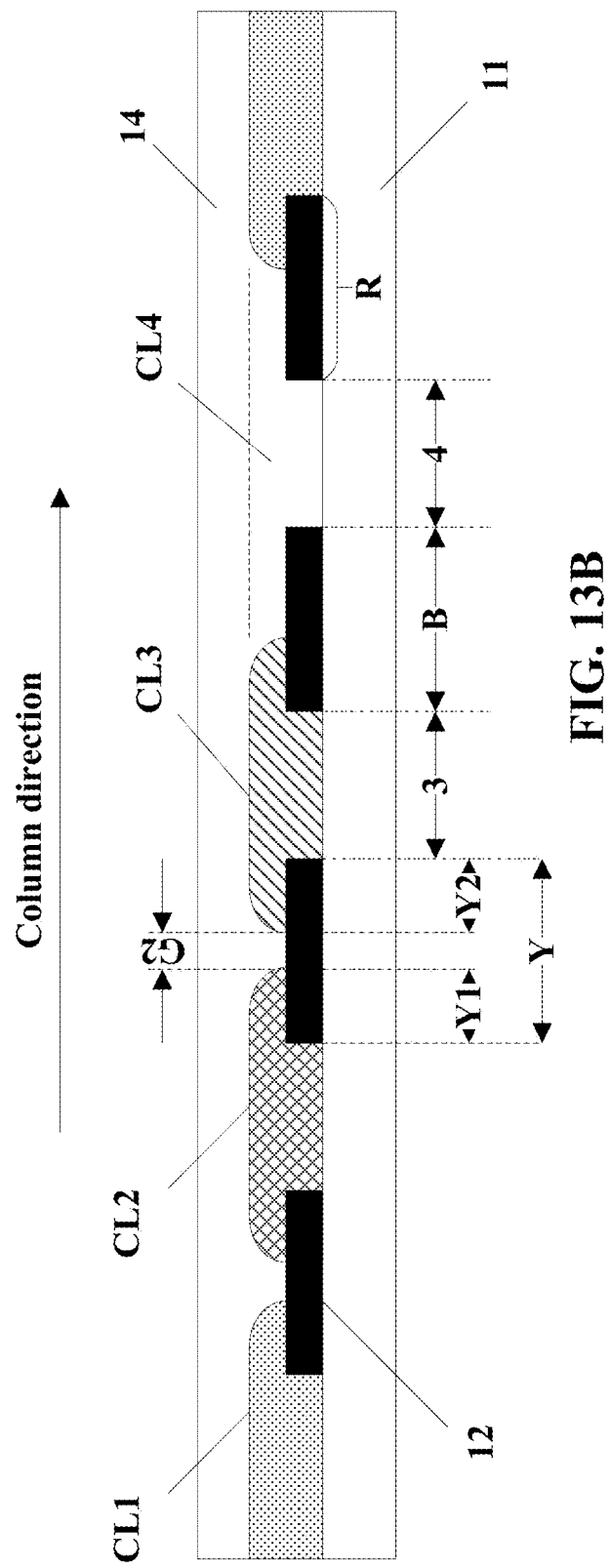
FIG. 13B is a cross-sectional view along a P-P' line in FIG. 13A.
Figure 13C:
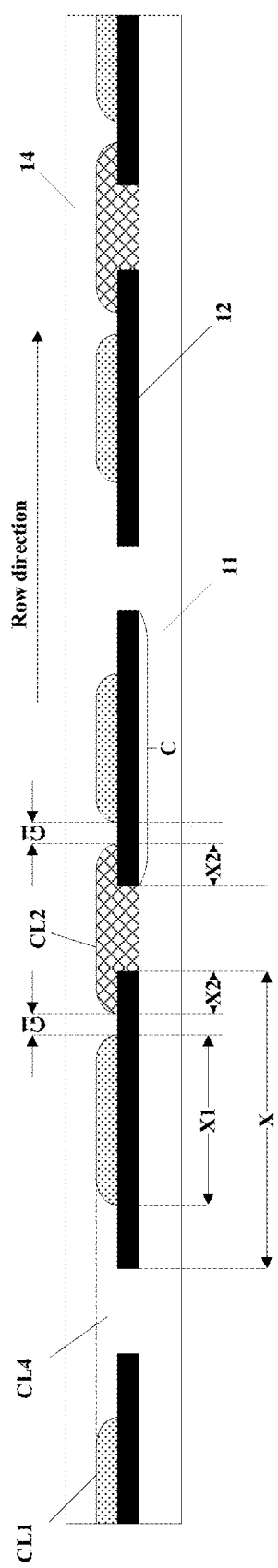
FIG. 13C is a cross-sectional view along a Q-Q' line in FIG. 13A.

In some embodiments, the subpixel of the fourth color is a white subpixel. FIG. 13A is a diagram illustrating the structure of a display substrate in some embodiments according to the present disclosure. FIG. 13B is a cross-sectional view along a P-P' line in FIG. 13A. FIG. 13C is a cross-sectional view along a Q-Q' line in FIG. 13A. Referring to FIG. 13A and FIG. 13B, the third color filter layer CL3 at least partially covers a respective one of the plurality of rows R of the black matrix 12 between the third region 3 and the fourth region 4. The respective one of the plurality of rows R of the black matrix 12 is directly adjacent to the third region 3 and directly adjacent to the fourth region 4. The fourth color filter layer CL4 is a substantially transparent layer made of a substantially transparent material. As used herein, the term "substantially transparent" means at least 50 percent (e.g., at least 60 percent, at least 70 percent, at least 80 percent, at least 90 percent, and at least 95 percent) of an incident light in the visible wavelength range transmitted therethrough.

Referring to FIG. 13A and FIG. 13B, in some embodiments, the display substrate further includes a protective layer 14 on a side of the first color filter layer CL1, the second color filter layer CL2, the third color filter layer CL3, and the black matrix 12 away from the base substrate 11. A portion of the protective layer 14 extends into the fourth region 4, constituting the fourth color filter layer CL4. For example, the fourth color filter layer CL4 and the protective layer 14 form an integral structure, are made of a same substantially transparent material.

Referring to FIG. 13A and FIG. 13B, in some embodiments, two color filter layers other than the fourth color filter layer CL4 (a portion of the protective layer 14) and directly adjacent to the respective one of the plurality of rows R of the black matrix 12 partially cover the respective one of the plurality of rows R of the black matrix 12 and are spaced apart from each other by a gap G2 in the black matrix region B and on a side of the respective one of the plurality of rows R of the black matrix 12 away from the base substrate 11. For example, the first color filter layer CL1 and the second color filter layer CL2 directly adjacent to the respective one of the plurality of rows R of the black matrix 12 partially cover the respective one of the plurality of rows R of the black matrix 12, the first color filter layer CL1 and the second color filter layer CL2 are spaced apart from each other by a gap G2 in the black matrix region B and on a side of the respective one of the plurality of rows R of the black matrix 12 away from the base substrate 11. In another example, the second color filter layer CL2 and the third color filter layer CL3 directly adjacent to the respective one of the plurality of rows R of the black matrix 12 partially cover the respective one of the plurality of rows R of the black matrix 12, the second color filter layer CL2 and the third color filter layer CL3 are spaced apart from each other by a gap G2 in the black matrix region B and on a side of the respective one of the plurality of rows R of the black matrix 12 away from the base substrate 11.

Referring to FIG. 13A and FIG. 13B, in some embodiments, the fourth color filter layer CL4 (a portion of the protective layer 14) is in direct contact with a directly adjacent color filter layer in the black matrix region B and on a side of the respective one of the plurality of rows R of the black matrix 12 away from the base substrate 11, the fourth color filter layer CL4 and the directly adjacent color filter layer cover the respective one of the plurality of rows R of the black matrix 12. For example, the fourth color filter layer CL4 is in direct contact with the first color filter layer CL1 in the black matrix region B and on a side of the respective one of the plurality of rows R of the black matrix 12 away from the base substrate 11, the fourth color filter layer CL4 and the first color filter layer CL1 cover the respective one of the plurality of rows R of the black matrix 12. In another example, the fourth color filter layer CL4 is in direct contact with the third color filter layer CL3 in the black matrix region B and on a side of the respective one of the plurality of rows R of the black matrix 12 away from the base substrate 11, the fourth color filter layer CL4 and the third color filter layer CL3 cover the respective one of the plurality of rows R of the black matrix 12. The first color filter layer CL1 is absent in a region between the second color filter layer CL2 and the third color filter layer CL3 in the plurality of openings, and the first color filter layer CL1 is absent in a region between the third color filter layer CL3 and the fourth color filter layer CL4 in the plurality of openings.

Referring to FIG. 13A and FIG. 13C, in some embodiments, two color filter layers other than the fourth color filter layer CL4 (a portion of the protective layer 14) and directly adjacent to the respective one of the plurality of columns C of the black matrix 12 partially cover the respective one of the plurality of columns C of the black matrix 12 and are spaced apart from each other by a gap G1 in the black matrix region B and on a side of the respective one of the plurality of columns C of the black matrix 12 away from the base substrate 11. For example, the first color filter layer CL1 and the second color filter layer CL2 directly adjacent to the respective one of the plurality of columns C of the black matrix 12 partially cover the respective one of the plurality of columns C of the black matrix 12, the first color filter layer CL1 and the second color filter layer CL2 are spaced apart from each other by a gap G1 in the black matrix region B and on a side of the respective one of the plurality of columns C of the black matrix 12 away from the base substrate 11.

Referring to FIG. 13A and FIG. 13C, in some embodiments, the fourth color filter layer CL4 (a portion of the protective layer 14) is in direct contact with a directly adjacent color filter layer in the black matrix region B and on a side of the respective one of the plurality of columns C of the black matrix 12 away from the base substrate 11, the fourth color filter layer CL4 and the directly adjacent color filter layer cover the respective one of the plurality of columns C of the black matrix 12. For example, the fourth color filter layer CL4 is in direct contact with the first color filter layer CL1 in the black matrix region B and on a side of the respective one of the plurality of columns C of the black matrix 12 away from the base substrate 11, the fourth color filter layer CL4 and the first color filter layer CL1 cover the respective one of the plurality of columns C of the black matrix 12.

Referring to FIG. 12F, in some embodiments, the subpixel of the fourth color is a yellow subpixel, and the fourth color filter layer CL4 in the fourth region is a yellow color filter. Optionally, each of the third color filter layer CL3 and the fourth color filter layer CL4 at least partially covers a respective one of the plurality of rows R of the black matrix 12 between, and directly adjacent to, the third region 3 and the fourth region 4. The respective one of the plurality of rows R of the black matrix 12 is directly adjacent to the third region 3 and directly adjacent to the fourth region 4.

Referring to FIG. 12A, FIG. 12B, and FIG. 12C, in some embodiments, the display substrate further includes a spacer layer 15 having a plurality of spacers in the black matrix region B. Optionally, the plurality of spacers are in regions corresponding to the plurality of columns C of the black matrix 12.

Referring to FIG. 12C, in some embodiments, a respective one of the plurality of columns C of the black matrix has a first width X along a row direction, and a respective one of the plurality of rows R of the black matrix has a second width Y along a column direction. Optionally, a ratio of first width X to the second width Y is in a range of 3:1 to 10:1. Optionally, X is in a range of 30 μm to 110 μm, e.g., 30 μm to 50 μm, 50 μm to 70 μm, 70 μm to 90 μm, 90 μm to 110 μm. Optionally, Y is in a range of 10 μm to 35 μm, e.g., 10 μm to 15 μm, 15 μm to 20 μm, 20 μm to 25 μm, 25 μm to 30 μm, and 30 μm to 35 μm.

In some embodiments, a respective subpixel aperture Spa of the display substrate has an elongated shape. Optionally, the elongated shape has a longitudinal width Z as shown in FIG. 12C. Optionally, Z is in a range of 100 μm to 300 μm, e.g., 100 μm to 150 μm, 150 μm to 200 μm, 200 μm to 250 μm, and 250 μm to 300 μm. Optionally, a ratio of a longitudinal width of the elongated shape to the first width X s in a range of 2.0 to 3.5, e.g., 2.0 to 2.5, 2.5 to 3.0, and 3.0 to 3.5. Optionally, a ratio of a longitudinal width Z of the elongated shape to a lateral width of the elongated shape is in a range of 1.5:1 to 6:1, e.g., 1.5:1 to 2.0:1, 2.0:1 to 2.5:1, 2.5:1 to 3.0:1; 3.0:1 to 3.5:1, 3.5:1 to 4.0:1, 4.0:1 to 4.5:1, 4.5:1 to 5.0:1, 5.0:1 to 5.5:1, and 5.5:1 to 6.0:1.

In another aspect, the present disclosure provides a display panel including the display substrate described herein, a second display substrate facing the display substrate, and a spacer layer between the display substrate and the second display substrate. Optionally, the spacer layer includes a plurality of spacers in the black matrix region, the plurality of spacers being in in regions corresponding to the plurality of columns of the black matrix. In another aspect, the present disclosure provides a display apparatus including the display panel described herein, and one or more integrated circuits connected to the display panel.

Figure 7:
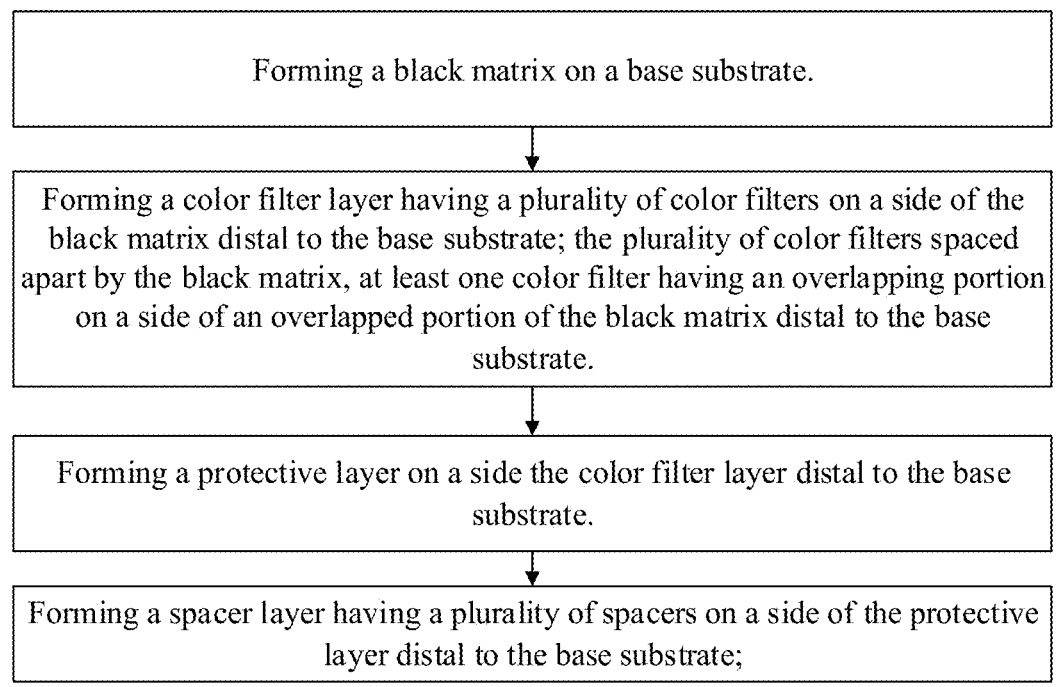
FIG. 7 is a flow chart illustrating a method of fabricating a display substrate in some embodiments.

In another aspect, the present disclosure provides a method of fabricating a display substrate. FIG. 7 is a flow chart illustrating a method of fabricating a display substrate in some embodiments. Referring to FIG. 7, the method in the embodiment includes forming a black matrix on a base substrate; forming a color filter layer having a plurality of color filters on a side of the black matrix distal to the base substrate; the plurality of color filters spaced apart by the black matrix, at least one color filter having an overlapping portion on a side of an overlapped portion of the black matrix distal to the base substrate; forming a protective layer on a side the color filter layer distal to the base substrate; and forming a spacer layer having a plurality of spacers on a side of the protective layer distal to the base substrate.

Figure 8A:
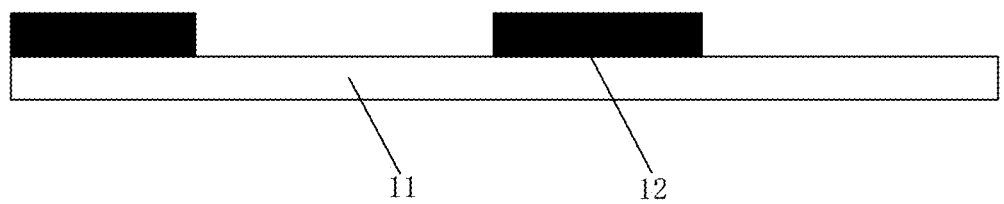
FIG. 8A is a diagram illustrating the formation of a black matrix on a base substrate in some embodiments.

FIG. 8A is a diagram illustrating the formation of a black matrix on a base substrate in some embodiments. Referring to FIG. 8A, a black matrix material layer is formed on a base substrate 11. The black matrix material layer is patterned to form a black matrix 12. The patterning process may include steps of photoresist application, exposure, developing, etching, photoresist removal, and so on.

The method may involve formation of a plurality of color filters. Optionally, a red color filter R, a green color filter G, a blue color filter B, and a white color filter W are formed on the black matrix. Optionally, a red color filter R, a green color filter G, and a blue color filter B are formed on the black matrix. Optionally, the color filter has a thickness in the range of about 1.8 µm to about 3.0 µm.

Figure 8B:
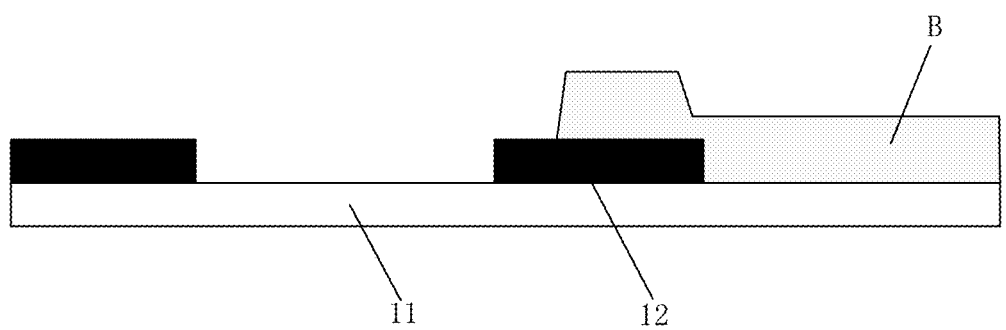
FIG. 8B is a diagram illustrating the formation of a blue color filter on a base substrate in some embodiments.

FIG. 8B is a diagram illustrating the formation of a blue color filter on a base substrate in some embodiments. Referring to FIG. 8B, the method in the embodiment includes forming a blue color filter on a side of the black matrix distal to the base substrate. Optionally, the blue color filter has an overlapping portion on a side of an overlapped portion of the black matrix distal to the base substrate. Optionally, a blue color filter material layer is formed on the black matrix 12, the blue color filter material layer is then patterned to form a blue color filter B. The patterning process may include steps of photoresist application, exposure, developing, etching, photoresist removal, and so on. Optionally, a mask plate as shown in FIG. 9 is used for patterning the blue color filter.

Figure 8C:
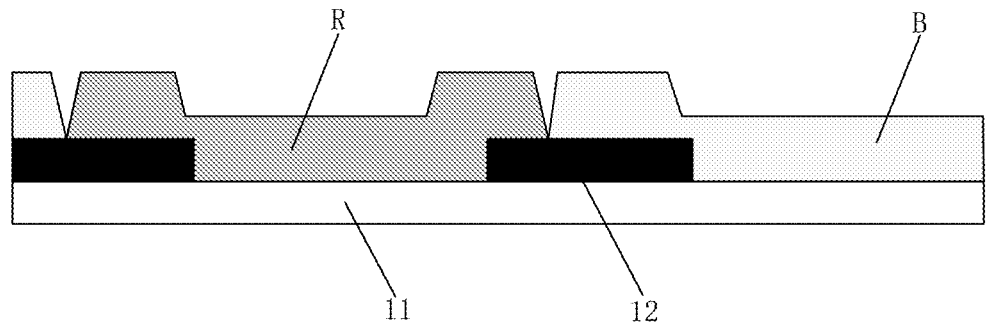
FIG. 8C is a diagram illustrating the formation of a red color filter on a base substrate in some embodiments.

FIG. 8C is a diagram illustrating the formation of a red color filter on a base substrate in some embodiments. Referring to FIG. 8C, the method in the embodiment includes forming a red color filter on a side of the black matrix distal to the base substrate. Optionally, the red color filter has an adjacent overlapping portion on a side of an adjacent overlapped portion of the black matrix distal to the base substrate. Optionally, a red color filter material layer is formed on the black matrix 12, the red color filter material layer is then patterned to form a red color filter R. The patterning process may include steps of photoresist application, exposure, developing, etching, photoresist removal, and so on.

Similarly, a green color filter and/or a white color filter may be formed by a method similar to the method described above in connection with the red color filter.

Figure 9:
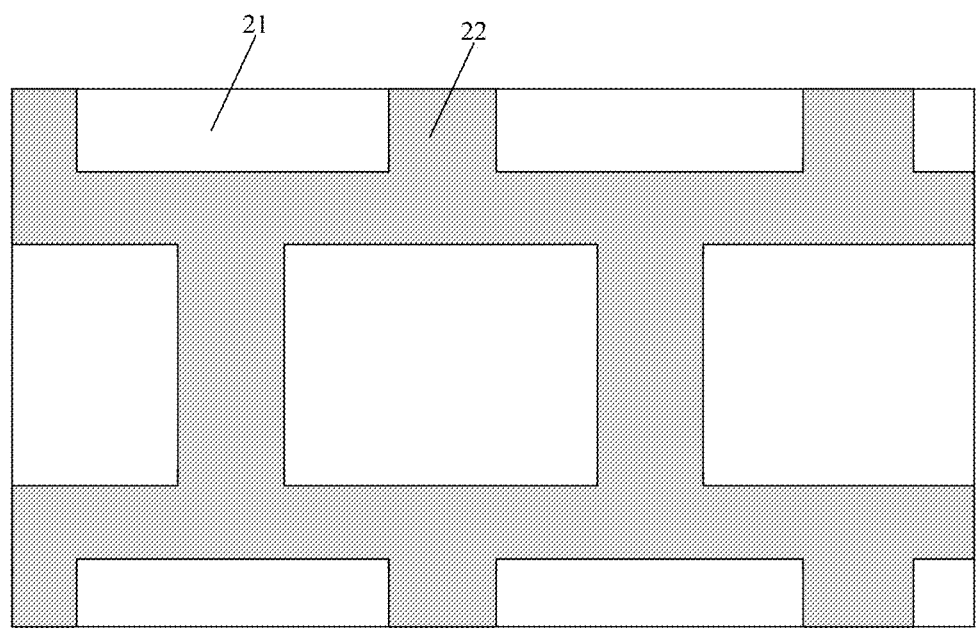
FIG. 9 is a diagram illustration the structure of a mask plate for fabricating a display substrate in some embodiments.

When forming the blue color filter (e.g., when a mask plate as shown in FIG. 9 is used), the blue color filter covers the majority of the surface area of the display substrate. Thus, a smaller amount of materials for forming other color filters is needed. In some cases, the materials for forming other color filters can be reduced by more than 20%, greatly lowering the manufacturing costs.

When any one of the red color filter R, the green color filter G, and the white color filter W includes an adjacent overlapping portion on a side of an adjacent overlapped portion of the black matrix distal to the base substrate, the adjacent overlapping portion extends over the adjacent overlapped portion of the black matrix by a distance of, e.g., 6 µm to about 7 µm.

Figure 8D:
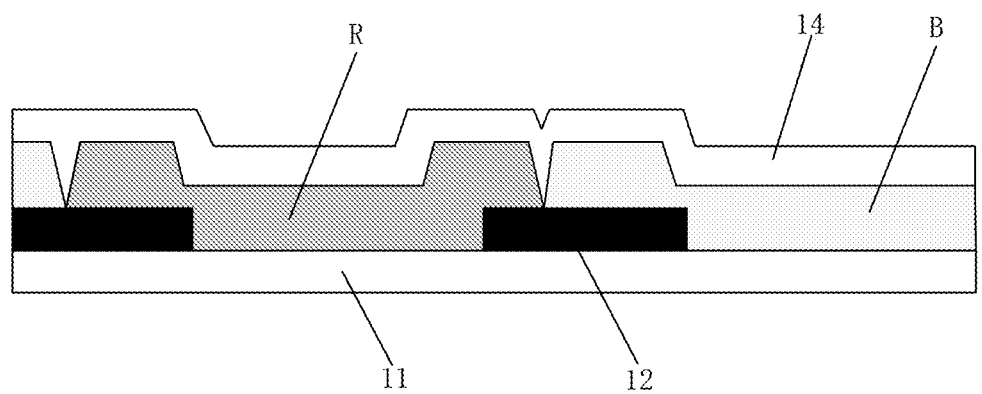
FIG. 8D is a diagram illustrating the formation of a protective layer on a base substrate in some embodiments.

FIG. 8D is a diagram illustrating the formation of a protective layer on a base substrate in some embodiments. Referring to FIG. 8D, a protective layer 14 is formed on a side of the red color filter R and the blue color filter B distal to the base substrate.

The spacer layer may be formed on the protective layer 14. Referring to FIG. 3, a spacer material layer is formed on a side of the protective layer 14 distal to the base substrate. The spacer material layer is then patterned to form a spacer layer. The patterning process may include steps of photoresist application, exposure, developing, etching, photoresist removal, and so on.

In a display substrate fabricated by the method described herein, at least one of the two adjacent color filters has an overlapping portion on a side of an overlapped portion of the black matrix distal to the base substrate, and the spacers disposed on the display substrate surface are in contact with and substantially level with the surface. By having this novel design, the surface planarization of the display substrate is greatly enhanced, the spacer elevations distribution throughout the display substrate is significantly more uniform. The recess in the region corresponding to the interface between two adjacent color filters has a much smaller dimension as compared to that of the convention display substrate. For example, the width and depth of the recess is much reduced. As a result, the liquid crystal layer around the recess region can recover quickly upon the withdrawal of external touch, resulting in a highly uniform touch darkness. Due to a much smaller recess dimension, the amount of liquid crystal required for the display panel can be reduced, lowering the manufacturing costs. In a display panel having the present display substrate, touch dark non-uniformity is significantly reduced or eliminated to a level of 1 or 2, as compared to a level of 4 to 5 in a conventional display panel.

FIG. 9 is a diagram illustration the structure of a mask plate for fabricating a display substrate in some embodiments. Referring to FIG. 9, the mask plate in the embodiment includes a target substrate 21 and a target pattern 22 on the target substrate 21. The target pattern 22 is used for patterning one of the color filters in the display substrate, e.g., the color filter on which the spacer is disposed. Optionally, the target pattern 22 is used for patterning the blue color filter.

In a display substrate fabricated by the mask plate described herein, at least one of the two adjacent color filters has an overlapping portion on a side of an overlapped portion of the black matrix distal to the base substrate, and the spacers disposed on the display substrate surface are in contact with and substantially level with the surface. By having this novel design, the surface planarization of the display substrate is greatly enhanced, the spacer elevations distribution throughout the display substrate is significantly more uniform. The recess in the region corresponding to the interface between two adjacent color filters has a much smaller dimension as compared to that of the convention display substrate. For example, the width and depth of the recess is much reduced. As a result, the liquid crystal layer around the recess region can recover quickly upon the withdrawal of external touch, resulting in a highly uniform touch darkness. Due to a much smaller recess dimension, the amount of liquid crystal required for the display panel can be reduced, lowering the manufacturing costs. In a display panel having the present display substrate, touch dark non-uniformity is significantly reduced or eliminated to a level of 1 or 2, as compared to a level of 4 to 5 in a conventional display panel.

Figure 11:
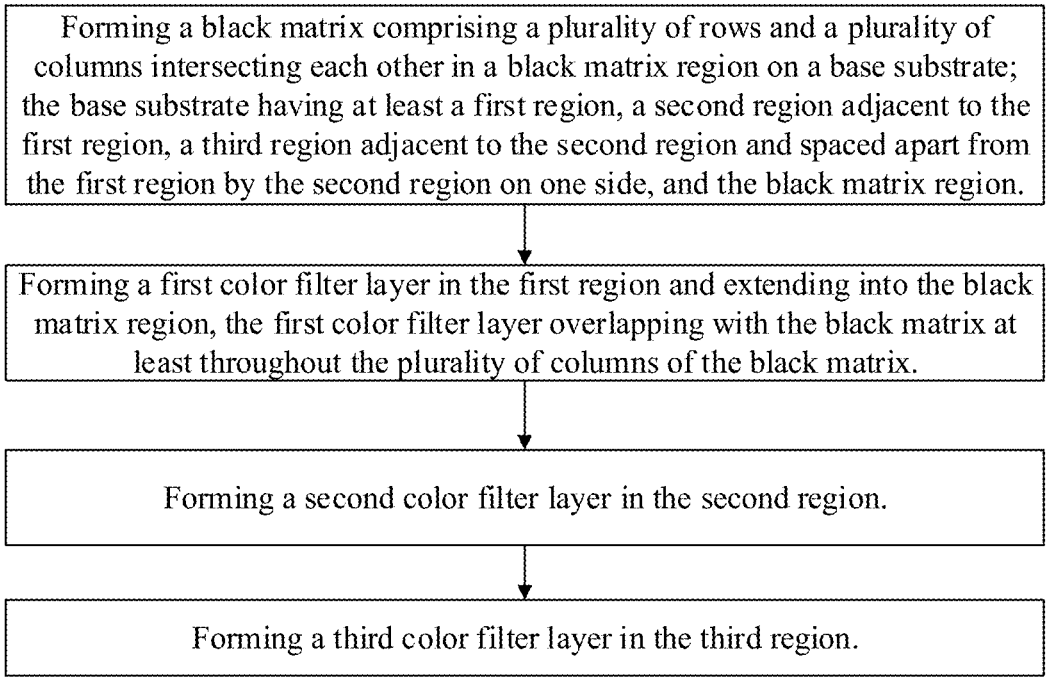
FIG. 11 is a flow chart illustrating a method of fabricating a display substrate in some embodiments.

FIG. 11 is a flow chart illustrating a method of fabricating a display substrate in some embodiments. Referring to FIG. 11, the method in the embodiment includes forming a black matrix comprising a plurality of rows and a plurality of columns intersecting each other in a black matrix region on a base substrate; the base substrate having at least a first region, a second region adjacent to the first region, a third region adjacent to the second region and spaced apart from the first region by the second region on one side, and the black matrix region; forming a first color filter layer in the first region and extending into the black matrix region, the first color filter layer overlapping with the black matrix at least throughout the plurality of columns of the black matrix; forming a second color filter layer in the second region; and forming a third color filter layer in the third region. The first region corresponds to a first pixel region in a corresponding array substrate, the second region corresponds to a second pixel region in the array substrate, the third region corresponds to a third pixel region in the corresponding array substrate, and the black matrix region is a region occupied by the black matrix on the display substrate (e.g., a color filter substrate). The black matrix includes a plurality of rows and a plurality of columns intersecting each other. Optionally, the display substrate further includes a fourth region corresponding to a fourth pixel region in the corresponding array substrate. For example, the first region may correspond to a blue pixel region, the second region may correspond to a green pixel region, the third region may correspond to a red pixel region, and the fourth region may correspond to a white pixel region.

In some embodiments, the second region is formed to be adjacent to the first region, the third region is formed to be adjacent to the second region, the fourth region is formed to be adjacent to the third region. The third region is formed to be spaced apart from the first region by the second region on one side, and spaced apart from the first region by the fourth region on the other side. The first region is formed to be adjacent to the second region on one side and adjacent to the fourth region on the other side.

In some embodiments, the first color filter layer is a blue color filter layer, the second color filter layer is a green color filter layer, the third color filter layer is a red color filter layer, and the fourth color filter layer is a white color filter layer.

In some embodiments, the first color filter layer is formed in the first region, and extends into the black matrix region. Optionally, the first color filter layer is formed to overlap with the black matrix throughout the plurality of columns of the black matrix (e.g., the first color filter layer is formed in at least the first region and column portions of the black matrix region). The second color filter layer is formed in the second region, the third color filter layer is formed in the third region, and the fourth color filter layer is formed in the fourth region. Optionally, the first color filter layer is formed to overlap with the black matrix throughout the plurality of rows and the plurality of columns of the black matrix. Optionally, the first color filter layer is formed to completely cover an entire area of the black matrix region throughout the plurality of rows and the plurality of columns of the black matrix.

In some embodiments, the first color filter layer is formed to abuts the second color filter layer at an interface between the first color filter layer and the second color filter layer along a column direction of the display substrate. That is, there is no gap between the first color filter layer and the second color filter layer, the first color filter layer and the second color filter layer are formed to fill any space between them. Optionally, the interface is within the black matrix region (e.g., within a row region of the black matrix). Optionally, the interface is outside the black matrix region (e.g., the first color filter layer alone is formed to fill in any space between the first color filter layer and the second color filter layer along the column direction of the display substrate). Optionally, the interface is at an interface between the black matrix region and the second region.

In some embodiments, the first color filter layer is formed to extend into an interface between the second color filter layer and the third color filter layer, the first color filter layer is formed to abut the second color filter layer on a first side and is formed to abut the third color filter layer on a second side at the interface. That is, there is no gap between the second color filter layer and the third color filter layer. Optionally, the first color filter layer is formed to fill in any space between them. Optionally, the first color filter layer, the second color filter layer, and the third color filter layer are formed to fill in any space between the second color filter layer and the third color filter layer.

In some embodiments, the first color filter layer is formed to extend into an interface between the fourth color filter layer and the third color filter layer, the first color filter layer is formed to abut the fourth color filter layer on a first side and is formed to abut the third color filter layer on a second side at the interface. That is, there is no gap between the fourth color filter layer and the third color filter layer. Optionally, the first color filter layer is formed to fill in any space between them. Optionally, the first color filter layer, the fourth color filter layer, and the third color filter layer are formed to fill in any space between the fourth color filter layer and the third color filter layer.

In some embodiments, the method further includes forming a protective layer at an interface between the second color filter layer and the third color filter layer, the protective layer is formed to abut the second color filter layer on a first side and is formed to abut the third color filter layer on a second side at the interface. That is, there is no gap between the second color filter layer and the third color filter layer. Optionally, the protective layer is formed to fill in any space between them. Optionally, the protective layer, the second color filter layer, and the third color filter layer are formed to fill in any space between the second color filter layer and the third color filter layer.

In some embodiments, the method further includes forming a protective layer at an interface between the fourth color filter layer and the third color filter layer, the protective layer is formed to abut the fourth color filter layer on a first side and is formed to abut the third color filter layer on a second side at the interface. That is, there is no gap between the fourth color filter layer and the third color filter layer. Optionally, the protective layer is formed to fill in any space between them. Optionally, the protective layer, the fourth color filter layer, and the third color filter layer are formed to fill in any space between the second color filter layer and the third color filter layer.

In some embodiments, the second color filter layer and the third color filter layer are formed to abut each other at an interface between the second color filter layer and the third color filter layer. That is, there is no gap between the second color filter layer and the third color filter layer. Optionally, the second color filter layer is formed to fill in any space between them. Optionally, the third color filter layer is formed to fill in any space between them. Optionally, the second color filter layer and the third color filter layer together are formed to fill in any space between the second color filter layer and the third color filter layer.

In some embodiments, the fourth color filter layer and the third color filter layer are formed to abut each other at an interface between the fourth color filter layer and the third color filter layer. That is, there is no gap between the fourth color filter layer and the third color filter layer. Optionally, the fourth color filter layer is formed to fill in any space between them. Optionally, the third color filter layer is formed to fill in any space between them. Optionally, the fourth color filter layer and the third color filter layer are formed so that the fourth color filter layer and the third color filter layer together fill in any space between the second color filter layer and the third color filter layer.

In some embodiments, the method further includes forming a spacer layer having a plurality of spacers in the black matrix region, the plurality of spacers are substantially on a same level with each other.

In another aspect, the present disclosure provides a method of fabricating a display substrate having at least a first region corresponding to a subpixel of a first color, a second region adjacent to the first region and corresponding to a subpixel of a second color, a third region adjacent to the second region and spaced apart from the first region by the second region on one side, the third region corresponding to a subpixel of a third color, and a black matrix region outside the first region, the second region, and the third region. In some embodiments, the method includes forming a black matrix on the base substrate and in the black matrix region, the black matrix comprising a plurality of rows and a plurality of columns intersecting each other; forming a first color filter layer having a net structure with a plurality of openings, and comprising a first portion in the first region and a second portion in the black matrix region, the first color filter layer substantially covering the plurality of columns of the black matrix; forming a second color filter layer in the second region; and forming a third color filter layer in the third region. Optionally, the second color filter layer and the third color filter layer are both formed in the plurality of openings, and are formed to be respectively spaced apart from the first color filter layer. Optionally, a first height of a surface of the first portion away from the base substrate relative to the base substrate and a second height of a surface of the second portion away from the base substrate relative to the base substrate are within 30% of each other.

In another aspect, the present disclosure provides a display panel having a display substrate described herein or manufactured by a method described herein (e.g., a color filter substrate). The display panel further includes a second display substrate (e.g., an array substrate).

In the present display panel, at least one of the two adjacent color filters has an overlapping portion on a side of an overlapped portion of the black matrix distal to the base substrate, and the spacers disposed on the display substrate surface are in contact with and substantially level with the surface. By having this novel design, the surface planarization of the display substrate is greatly enhanced, the spacer elevations distribution throughout the display substrate is significantly more uniform. The recess in the region corresponding to the interface between two adjacent color filters has a much smaller dimension as compared to that of the convention display substrate. For example, the width and depth of the recess is much reduced. As a result, the liquid crystal layer around the recess region can recover quickly upon the withdrawal of external touch, resulting in a highly uniform touch darkness. Due to a much smaller recess dimension, the amount of liquid crystal required for the display panel can be reduced, lowering the manufacturing costs. In a display panel having the present display substrate, touch dark non-uniformity is significantly reduced or eliminated to a level of 1 or 2, as compared to a level of 4 to 5 in a conventional display panel.

In another aspect, the present disclosure provides a display apparatus having a display panel described herein.

Optionally, the display apparatus is an Advanced Super Dimension Switch (ADS)-type display device. Optionally, the second display substrate is an ADS-type array substrate.

In the present display apparatus, at least one of the two adjacent color filters has an overlapping portion on a side of an overlapped portion of the black matrix distal to the base substrate, and the spacers disposed on the display substrate surface are in contact with and substantially level with the surface. By having this novel design, the surface planarization of the display substrate is greatly enhanced, the spacer elevations distribution throughout the display substrate is significantly more uniform. The recess in the region corresponding to the interface between two adjacent color filters has a much smaller dimension as compared to that of the convention display substrate. For example, the width and depth of the recess is much reduced. As a result, the liquid crystal layer around the recess region can recover quickly upon the withdrawal of external touch, resulting in a highly uniform touch darkness. Due to a much smaller recess dimension, the amount of liquid crystal required for the display panel can be reduced, lowering the manufacturing costs. In a display panel having the present display substrate, touch dark non-uniformity is significantly reduced or eliminated to a level of 1 or 2, as compared to a level of 4 to 5 in a conventional display panel.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A display substrate having at least a first region corresponding to a subpixel of a first color, a second region adjacent to the first region and corresponding to a subpixel of a second color, a third region adjacent to the second region and spaced apart from the first region by the second region on one side, the third region corresponding to a subpixel of a third color, and a black matrix region outside the first region, the second region, and the third region, comprising:
- a base substrate;
- a black matrix on the base substrate and in the black matrix region, the black matrix comprising a plurality of rows and a plurality of columns intersecting each other;
- a first color filter layer being a one piece net structure with a plurality of openings, and comprising a first portion in the first region and a second portion in the black matrix region, the first color filter layer substantially covering the plurality of columns of the black matrix;
- a second color filter layer in the second region; and
- a third color filter layer in the third region;
- wherein the second color filter layer and the third color filter layer are both in the plurality of openings, and are respectively spaced apart from the first color filter layer;
- a first height of a surface of the first portion away from the base substrate relative to the base substrate and a second height of a surface of the second portion away from the base substrate relative to the base substrate are within 30% of each other;
- throughout a respective one of the plurality of columns of the black matrix, and in a space between any pair of two adjacent subpixels, the second portion covers 80% to 90% of the respective one of the plurality of columns of the black matrix along a row direction, and a color filter layer other than the first color filter layer and directly adjacent to the respective one of the plurality of columns of the black matrix covers 1% to 10% of the respective one of the plurality of columns of the black matrix along the row direction;
- the respective one of the plurality of columns of the black matrix has a first width along the row direction;
- a respective one of the plurality of rows of the black matrix has a second width along a column direction; and
- a ratio of the first width to the second width is in a range of 3:1 to 10:1.

2. The display substrate of claim 1, wherein a difference between the second height and the first height is greater than or equal to 0, and less than or equal to a thickness of the black matrix between the second portion and the base substrate, and the second height is greater than or equal to the first height.

3. The display substrate of claim 2, wherein, throughout the respective one of the plurality of columns of the black matrix, and in the space between any pair of two adjacent subpixels, the second portion covers 84% to 90% of the respective one of the plurality of columns of the black matrix along the row direction, and the color filter layer other than the first color filter layer and directly adjacent to the respective one of the plurality of columns of the black matrix covers 6% to 10% of the respective one of the plurality of columns of the black matrix along the row direction.

4. The display substrate of claim 1, wherein, throughout the respective one of the plurality of columns of the black matrix, and in the space between any pair of two adjacent subpixels, 0% to 5% of the respective one of the plurality of columns of the black matrix along the row direction is uncovered by any color filter layer.

5. The display substrate of claim 1, wherein at least one of two color filter layers directly adjacent to the respective one of the plurality of rows of the black matrix partially covers the respective one of the plurality of rows of the black matrix.

6. The display substrate of claim 5, wherein the two color filter layers directly adjacent to the respective one of the plurality of rows of the black matrix are spaced apart from each other by a gap in the black matrix region and on a side of the respective one of the plurality of rows of the black matrix away from the base substrate.

7. The display substrate of claim 5, wherein each of the two color filter layers directly adjacent to the respective one of the plurality of rows of the black matrix partially covers the respective one of the plurality of rows of the black matrix, the two color filter layers corresponding to subpixels other than a subpixel of white color.

8. The display substrate of claim 1, further having a fourth region adjacent to the third region and corresponding to a subpixel of a fourth color, the third region spaced apart from the first region by the second region on a first side and spaced apart from the first region by the fourth region on a second side.

9. The display substrate of claim 8, wherein the subpixel of the fourth color is a white subpixel; and
- the third color filter layer at least partially covers the respective one of the plurality of rows of the black matrix between, and directly adjacent to, the third region and the fourth region.

10. The display substrate of claim 8, further comprising a fourth color filter layer in the fourth region, wherein the fourth color filter layer is in the plurality of openings, and the fourth color filter layer comprises a substantially transparent material.

11. The display substrate of claim 10, further comprising a protective layer on a side of the first color filter layer, the second color filter layer, the third color filter layer, and the black matrix away from the base substrate;
- wherein a portion of the protective layer extends into the fourth region, constituting the fourth color filter layer.

12. The display substrate of claim 8, wherein the subpixel of the fourth color is a yellow subpixel;
- the display substrate further comprises a fourth color filter layer in the fourth region, the fourth color filter layer is in the plurality of openings, the fourth color filter being a yellow color filter; and
- each of the third color filter layer and the fourth color filter layer at least partially covers the respective one of the plurality of rows of the black matrix between, and directly adjacent to, the third region and the fourth region.

13. The display substrate of claim 1, further comprising a spacer layer having a plurality of spacers in the black matrix region, the plurality of spacers being in regions corresponding to the plurality of columns of the black matrix.

14. The display substrate of claim 1, wherein a respective subpixel aperture of the display substrate has an elongated shape;
- the respective one of the plurality of columns of the black matrix has a first width along the row direction; and
- a ratio of a longitudinal width of the elongated shape to the first width is in a range of 2.0 to 3.5.

15. The display substrate of claim 1, wherein the first color filter layer is absent in a region between the second color filter layer and the third color filter layer in the plurality of openings.

16. The display substrate of claim 1, wherein each of the first region, the second region, and the third region has a substantially rectangular shape;

wherein a longitudinal side of the substantially rectangular shape is substantially parallel to the plurality of columns of the black matrix; and a lateral side of the substantially rectangular shape is substantially parallel to the plurality of rows of the black matrix.

17. A display panel comprising the display substrate of claim 1, a second display substrate facing the display substrate, and a spacer layer between the display substrate and the second display substrate, wherein the spacer layer comprising a plurality of spacers in the black matrix region, the plurality of spacers being in regions corresponding to the plurality of columns of the black matrix.

18. The display substrate of claim 1, further having a fourth region adjacent to the third region and corresponding to a subpixel of a white color in the plurality of openings, the third region spaced apart from the first region by the second region on a first side and spaced apart from the first region by the fourth region on a second side;

the display substrate further comprises a protective layer on a side of the first color filter layer, the second color filter layer, the third color filter layer, and the black matrix away from the base substrate;

a portion of the protective layer extends into the fourth region, constituting a substantially transparent fourth color filter layer for the subpixel of the white color;

two color filter layers other than the substantially transparent fourth color filter layer and directly adjacent to the respective one of the plurality of rows of the black matrix partially cover the respective one of the plurality of rows of the black matrix and are spaced apart from each other by a gap in the black matrix region and on a side of the respective one of the plurality of rows of the black matrix away from the base substrate;

the substantially transparent fourth color filter layer is in direct contact with a directly adjacent color filter layer in the black matrix region and on a side of the respective one of the plurality of rows of the black matrix away from the base substrate, the substantially transparent fourth color filter layer and the directly adjacent color filter layer covering the respective one of the plurality of rows of the black matrix;

two color filter layers other than the substantially transparent fourth color filter layer and directly adjacent to the respective one of the plurality of columns of the black matrix partially cover the respective one of the plurality of columns of the black matrix and are spaced apart from each other by a gap in the black matrix region and on a side of the respective one of the plurality of columns of the black matrix away from the base substrate;

the substantially transparent fourth color filter layer is in direct contact with the first color filter layer in the black matrix region and on a side of the respective one of the plurality of columns of the black matrix away from the base substrate, the substantially transparent fourth color filter layer and the first color filter layer covering the respective one of the plurality of columns of the black matrix; and the display substrate further comprises a spacer layer having a plurality of spacers in the black matrix region, the plurality of spacers being in in regions corresponding to the plurality of columns of the black matrix.

* * * * *